United States Patent
Ethier et al.

(10) Patent No.: US 11,310,078 B2
(45) Date of Patent: Apr. 19, 2022

(54) CIPHER STREAM BASED SECURE PACKET COMMUNICATIONS WITH KEY STREAM TRANSMISSION OVER DIVERSE PATHS

(71) Applicant: nexVortex, Inc., Herndon, VA (US)

(72) Inventors: Randall Paul Joseph Ethier, Burke, VA (US); Anatoly Y. Rodionov, Reston, VA (US); Jordan Steven Feldman, Cupertino, CA (US)

(73) Assignee: Wesley Rogers, Reston, VA (US)

( * ) Notice: Subject to any disclaimer, the term of this patent is extended or adjusted under 35 U.S.C. 154(b) by 168 days.

(21) Appl. No.: 16/244,177

(22) Filed: Jan. 10, 2019

(65) Prior Publication Data
US 2019/0215188 A1    Jul. 11, 2019

Related U.S. Application Data

(60) Provisional application No. 62/616,115, filed on Jan. 11, 2018.

(51) Int. Cl.
*H04L 12/46*    (2006.01)
*H04L 47/70*    (2022.01)
*H04L 9/06*    (2006.01)

(52) U.S. Cl.
CPC .......... *H04L 12/4641* (2013.01); *H04L 9/065* (2013.01); *H04L 9/0618* (2013.01); *H04L 47/825* (2013.01)

(58) Field of Classification Search
CPC ... H04L 12/4641; H04L 9/0618; H04L 9/065; H04L 47/825
See application file for complete search history.

(56) References Cited

U.S. PATENT DOCUMENTS 6,986,046 B1 * 1/2006 Tuvell ................... H04L 63/062
                                                        713/171
2007/0009102 A1    1/2007 Gong et al.
(Continued)

OTHER PUBLICATIONS

Bhattad, Kapil et al., "Weakly Secure Network Coding." First Workshop on Network Coding, Theory and Applications, Apr. 2005, No. 104 (2005), Publisher: NetCod, Published in: https://www.researchgate.net/publication/248407006_Weakly_Secure_Network_Coding.

(Continued)

*Primary Examiner* — Ashokkumar B Patel
*Assistant Examiner* — William B Jones
(74) *Attorney, Agent, or Firm* — Wolter Van Dyke Davis, PLLC; Eugene J. Molinelli

(57) ABSTRACT

Techniques for sending encrypted data includes establishing a plurality of different links between a first node and a different second node. The different links are different physical layer links or different virtual private network (VPN) links or some combination. The method also includes encrypting plaintext using a first value for an encryption parameter to produce ciphertext. Further, the method includes sending a first plurality of messages that indicate the ciphertext using at least one link of the plurality of different links. Still further, the method includes sending a different second plurality of messages that indicate the first value for the encryption parameter using at least one different link of the plurality of different links without introducing a random bit error.

12 Claims, 23 Drawing Sheets

(56) References Cited

U.S. PATENT DOCUMENTS

2009/0285175 A1* 11/2009 Nix .................. H04L 29/125
                                            370/331
2018/0034797 A1*  2/2018 Chao ................ H04L 63/06
2018/0167307 A1*  6/2018 Barry ............... H04L 45/50

OTHER PUBLICATIONS

Cai, Ning and Yeung, Raymond, "Secure Network Coding. In Information Theory," 2002, Jun. 30, 2002, p. 323, Publisher: IEEE International Symposium, Published in: Lausanne, Switzerland.

Yan, Muxi et al., "Algorithms for Weakly Secure Data Exchange", 2013, pp. 1-6, Publisher: 2013 International Symposium on Network Coding (NetCod), Published in: doi: 10.1109/NetCod.2013.6570836.

Yan, Muxi, et al., "Weakly Secure Data Exchange with Generalized Reed Solomon Codes", 2014, pp. 1366-1370, Publisher: IEEE International Symposium on Information Theory, Published in: http://www.math.tamu.edu/~zelenko/muxisprintson1.pdf.

\* cited by examiner

CIPHER STREAM BASED SECURE PACKET COMMUNICATIONS WITH KEY STREAM TRANSMISSION OVER DIVERSE PATHS

CROSS-REFERENCE TO RELATED APPLICATIONS

This application claims benefit of Provisional Appln. 62/616,115, filed Jan. 11, 2018, the entire contents of which are hereby incorporated by reference as if fully set forth herein, under 35 U.S.C. § 119(e).

BACKGROUND

Networks of general purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Some network layer addresses, including IP addresses, are hierarchical and can be aggregated. Hierarchical addresses are organized into numerous groups and subgroups and subgroups of subgroups, etc. Each layer of subgroups successively narrow the address space until at, the finest level of granularity of the address space, a single element of the network is indicated (e.g., a network interface card on a network node). A group address aggregates the addresses in the subgroups of that group.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). In a link-state protocol, two routers establish an adjacency relationship between them by first verifying direct two-way communication between them over the same network segment and then synchronizing their link-state databases. Link-state data describe all links to a router and describes the network addresses reachable on each of those links, as well as other properties of the link. Once the adjacency relationship is established, the two routers are called peers. During a reliable flooding stage of a link-state protocol, each router is required to ensure that each of its peers has received the link-state data describing the router's own links.

When establishing secure links between source and destination nodes, at least some payloads of data packets are often encrypted. The decryption information must be provided to the destination node, such as with public and private keys or other information communicated out of channel, that is, in a different communication channel than the channel carrying the data packets.

In the Citrix product brochure "Citrix NetScaler SD-WAN Product Overview, Use NetScaler SD-WAN to ensure an optimal user experience and application availability while reducing WAN costs" states on page 4 "Optional features such as . . . splitting a flow on multiple links protect company data from being interpreted or modified."

Viprinet's file how-viprinet-works within the folder technology within the folder en within the domain viprinet of superdomain com stated "The data stream from the LAN is encrypted by the Multichannel VPN Router and distributed onto the Internet connections (here: 2× DSL, 1× 3G/UMTS). The encrypted and fragmented data passes the networks of the utilized ISPs and reaches the Multichannel VPN Hub in the data center, which in turn decrypts the data stream and reassembles it correctly. Afterwards, the data stream is forwarded to its actual destination on the Internet. The same goes for the opposite direction: Here, the Hub encrypts the data stream, while the VPN Router decrypts it."

The Wikipedia article "Stream Cipher" explains that in cipher streaming a key and nonce is inputted to an encrypting generator which then outputs a keystream that when XOR'ed with the plaintext produces ciphertext. The receiving side of the ciphertext has the same generator but it now plays the role of a decrypting generator. When the same key and nonce are input, the same generator logic yields the very same keystream which when XOR'ed with the received ciphertext yields the original plaintext. The encrypting and decrypting cipher stream generators are the same; thus, on the sending and receiving ends the same key and nonce pairs yield the same keystream which when Exclusive Or'ed (XOR'ed) on the plaintext yields the ciphertext but when XOR'ed on the ciphertext returns the original plaintext.

U.S. Pat. Nos. 8,386,800 and 8,707,052 set the nonce to a cipher stream generator as the sequence number of a packet such as a TCP Packet Sequence Number.

The Wikipedia article "Tunneling protocol" gives as an example of a tunneling protocol an IP packet inside of an IP packet.

The Wikipedia article "SD-WAN" describes edge packet routers supporting multiple access links connecting to two or more transport networks. FIG. 1 shows an edge router 110 connecting to three different networks: a cellular access and transport network; a managed Multi-Protocol Label Switching (MPLS) network; and, the Public Internet.

The United States Patent Application US 2007/0009102 "Secure Keystream Transmission Methods For Wireless Communication Systems" by Weibo Gong and David M. Pozar, which specifically addresses security in data transmission within a wireless network, states in its summary "The purpose of the CRS is to ensure that when the receivers are receiving the keystream from the keystream sources such as the Wireless Access Point (WAP), the receivers at different locations will receive signals with bit errors at different times." The point to note is that the keystream is sent redundantly from the sender of the cipher stream to the receiver of the cipher stream over different antennas with uniquely varying bit errors recoverable by the collective receipt of said transmissions and random noise reduction processing.

SUMMARY

In prior art except for Gong 2007 the key stream is not sent from the sender to the recipient in parallel with the cipher stream. Sending the key stream from the sender to the receiver pre-empts the management burden of having to provision the key stream at the receiver in advance of the communication.

Techniques are provided for improving the transport of decryption information to a destination node. Unlike the prior art, these techniques, in various embodiments, separately transport a fragmented cipher text stream and a fragmented decryption key stream over diverse paths across diverse networks of varying network types, which may dynamically change over time in some embodiments. In some embodiments, these techniques ingest intentional variable delays and purposely mis-aligned ordinal sequencing between the key and cipher streams to thwart unwanted interception and decryption.

In a first set of embodiments, a method for sending encrypted data includes establishing a plurality of different links between a first node and a different second node. The different links are different physical layer links or different virtual private network (VPN) links or some combination. The method also includes encrypting plaintext using a first value for an encryption parameter to produce ciphertext. Further, the method includes sending a first plurality of messages that indicate the ciphertext using at least one link of the plurality of different links. Still further, the method includes sending a different second plurality of messages that indicate the first value for the encryption parameter using at least one different link of the plurality of different links without purposefully introducing a random bit error.

In some embodiments of the first set, the encryption parameter is a keystream nonce for XOR encryption with the same keystream nonce for XOR decryption. The messages for both the ciphertext and the first value for the keystream nonce alternate over the plurality of links; but, a message for the ciphertext and a message for the corresponding keystream nonce are not sent over the same link. In some of these embodiments, messages for both the ciphertext and the first value for the keystream nonce alternate randomly over the plurality of links. In some of these embodiments, each message for the ciphertext and each message for the keystream nonce includes a sequence number and the messages are not sent in the same sequence order.

In some embodiments of the first set, each message of the first plurality of messages and each message of the second plurality of messages also includes data that indicates a session identifier that indicates a message belongs to the original plaintext and not to a different plaintext.

In some embodiments of the first set, each message of the first plurality of messages and each message of the second plurality of messages also includes data that indicates a group identifier that indicates a link over which the message is sent belongs to the plurality of different links.

In some embodiments of the first set, an encryption algorithm that uses the value of the encryption parameter is different for different messages or for different plaintext.

In some embodiments of the first set, the plurality of different links includes at least one unidirectional link.

In some embodiments of the first set, the messages for the ciphertext are sent during a first time interval and the messages for the value of the encryption parameter are sent during a different second time interval. In some of these embodiments, first time interval and the second time interval do not overlap in time.

In a second set of embodiments, a method for sending encrypted data includes establishing a plurality of different links between a first node and a different second node. The different links are different physical layer links or different virtual private network (VPN) links or some combination. The method also includes receiving a first plurality of messages that indicate ciphertext using at least one link of the plurality of different links. Further, the method includes receiving a different second plurality of messages that indicate a first value for an encryption parameter using at least one different link of the plurality of different links without a random bit error. Still further, the method includes decrypting the ciphertext based on the first value for the encryption parameter to produce plaintext.

In some embodiments of the second set, each message for the ciphertext and each message for the keystream nonce includes a sequence number. The messages are not received in the same sequence order. Decrypting the ciphertext further comprises decrypting the ciphertext in sequence number order.

In some embodiments of the second set, each message of the first plurality of messages and each message of the second plurality of messages also includes data that indicates a session identifier that indicates a message belongs to the plaintext and not to a different plaintext. Decrypting the ciphertext further comprises decrypting the ciphertext only for messages that indicate the session identifier.

In some embodiments of the second set, each message of the first plurality of messages and each message of the second plurality of messages also includes data that indicates a group identifier that indicates a link over which the message is sent belongs to the plurality of different links. Decrypting the ciphertext further comprises decrypting the ciphertext using all messages that indicate the group identifier.

In other embodiments, a computer readable medium or apparatus or system is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Techniques are described for using different channels to securely transmit ciphertext and the associated decryption information. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of packet IP networks and within them IP Tunnels. However, the invention is not limited to this context. In other embodiments the invention applies to any and all types of communications networks (e.g. IP, MPLS, ATM, circuit switched, Frame Relay, X.25). Within network types other than IP, IP Tunnel equivalents or similar constructs would be employed. For instance in a MPLS network a MPLS label-switched path may be used in lieu of an IP Tunnel.

1. Overview

Figure 1:
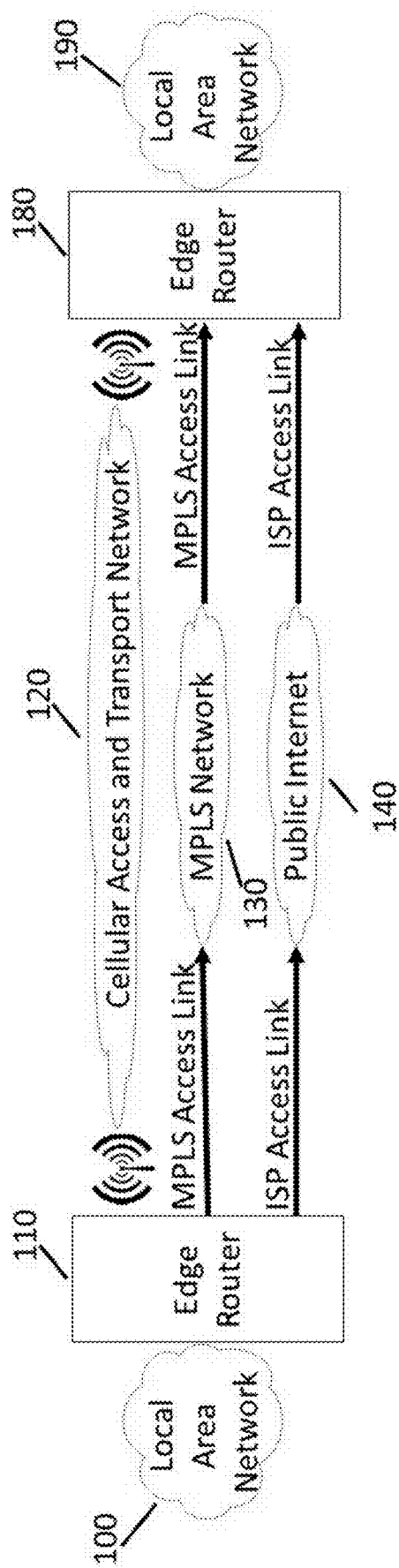
FIG. 1 is a block diagram that illustrates an example in prior art of two edge routers each at a Local Area Network's (LAN's) edge and each edge router with multiple WAN Accesses.
Figure 2:
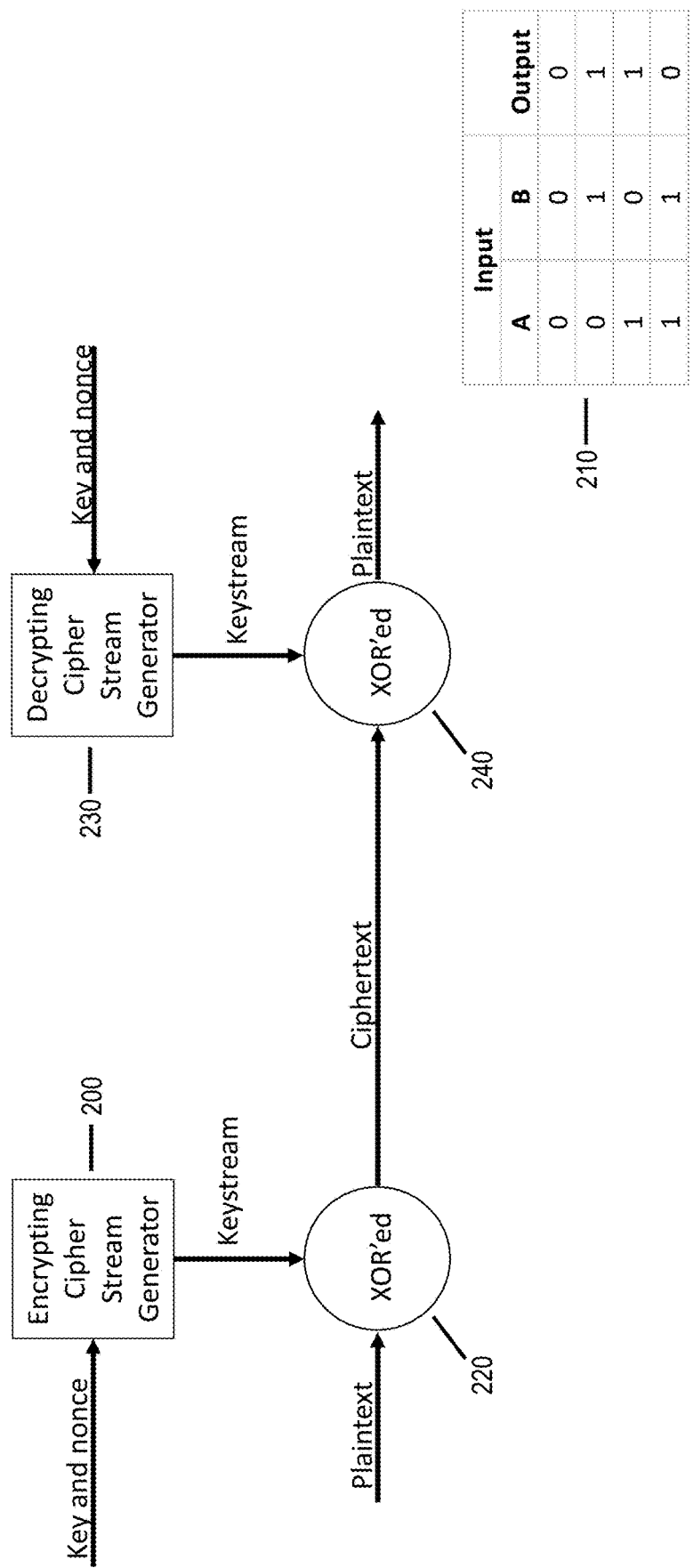
FIG. 2 is a block diagram that illustrates how in prior art a key stream is used to encrypt a plain text stream into a cipher stream on the sending side and how to decrypt the received cipher stream back to plain text on the receiving side.

The various embodiments leverage one or more of previous techniques in unique combinations:

deriving cipher text from plane text by way of a key stream as depicted in FIG. 2 whereby on the sending side the Encrypting Cipher Stream Generator 200 outputs a Keystream which the function 220 XORs the plaintext input as per XOR table 210 (e.g., in a row A is a bit from the plaintext and B is a bit from the keystream and the Output is the resulting XOR'ed ciphertext bit) yielding ciphertext sent to and received by the function 240 which XORs the keystream from the Decrypting Cipher Stream Generator 230 as per the XOR table 210 (e.g., in a row A is a bit from the ciphertext and B is a bit from the keystream and the Output is the resulting XOR'ed plaintext bit) yielding the original plaintext;

fragmenting of encrypted communication from Local Area Network 100 connecting to Edge Router 110 to Local Area Network 190 connecting to Edge Router 180 over multiple paths potentially spanning different networks of varying types such as Cellular Access and Transport Network 120, MPLS Network 130, and Public Internet 140 as shown in FIG. 1; and transmitting the key stream from the sender of the cipher text to the receiver of the cipher text like that of Gong 2007 but with various significant improvements.

Unlike prior art, the various techniques fragment both the cipher stream and the decrypting key streams across two or more paths potentially spanning two or more networks potentially spanning two or more network types. Such fragmentation across paths where each path potentially involves a different network (network provider A, network provider B, etc.) and potentially each network involves a different type of network complicates unwanted interception. Some examples of network types are terrestrial IP, terrestrial MPLS, over the air cellular, and satellite. A path may convey both cipher stream and decrypting key stream instances so long as a specific instance of a key stream packet that decrypts a specific encrypted cipher stream packet instance convey over separate paths. In the case of non-real-time communications asynchronous time lagged transport of the said instances and intentional mis-ordering of key stream and cipher stream instances add to the intentional obfuscation further deterring meaningful interception. The invention complicates the meaningful interception of both the complete cipher stream and key stream while at the same time easing the administrative burden of the secure communications by removing the need to supply the receiver in advance with the decrypting key stream information.

Various embodiments of the invention are subsequently described in the context of an IP service employing IP tunnels overlaying multiple networks (e.g. wired MPLS, cellular, satellite) with increasing levels of sophistication providing increasing levels of security.

Figure 3:
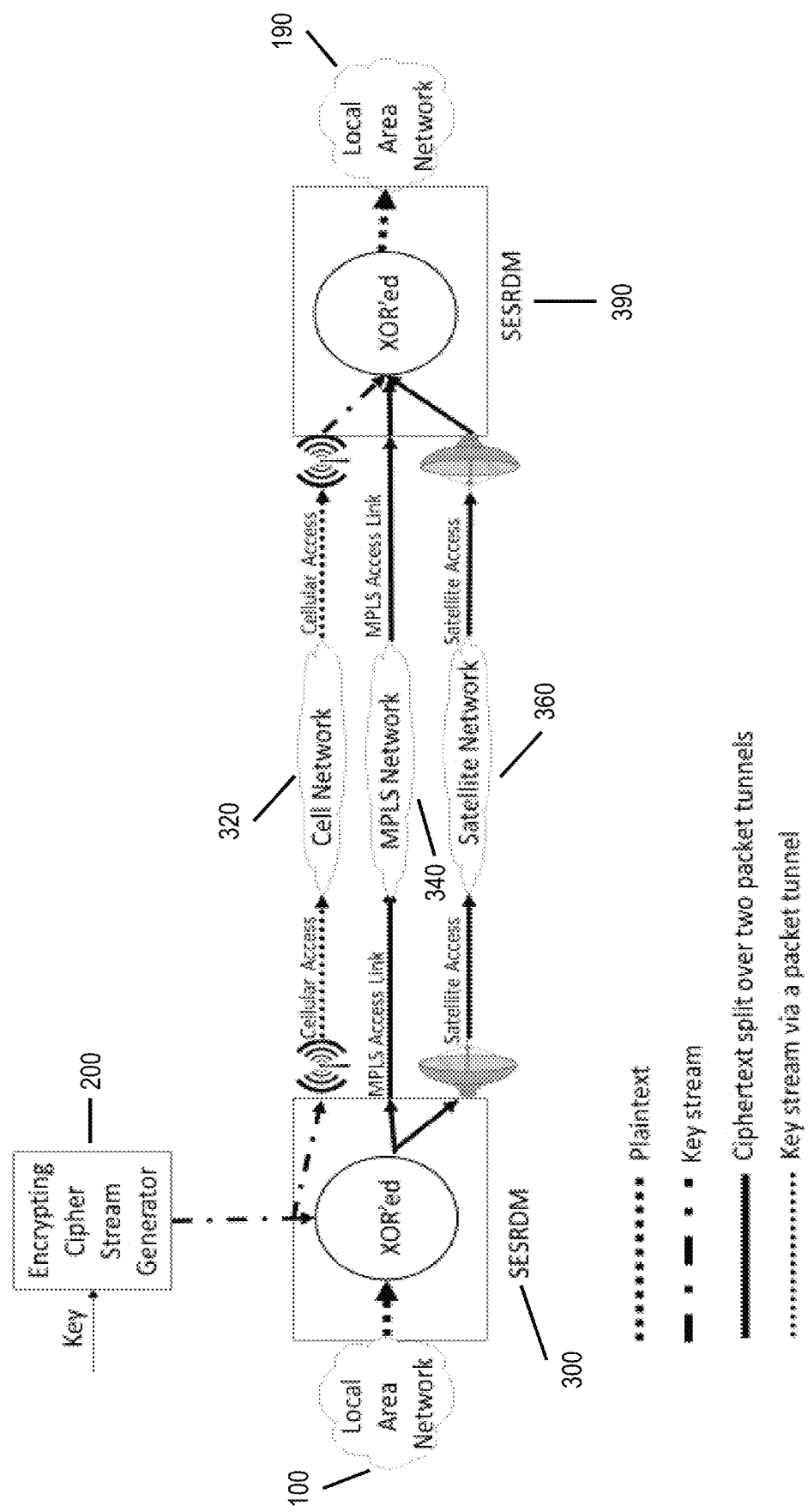
FIG. 3 is a block diagram illustrating the encryption of the plain text traffic by way of cipher streaming technology, fragmenting the cipher stream, and also sending the decrypting key stream and said fragmented cipher stream over diverse and separate paths in accordance to an embodiment.

FIG. 3 is a block diagram illustrating in accordance to an embodiment the encryption of the plain text traffic by way of cipher streaming technology, fragmenting the cipher stream, and then sending the decrypting key stream and said fragmented cipher stream over diverse and separate paths in accordance to an embodiment. In an embodiment illustrated by FIG. 3 secure communications in the direction from Local Area Network (LAN) 100 to LAN 190 is shown. Encrypting Cipher Stream Generator 200 sends a key stream to the Sending Encrypt/Split and Receiving Decrypt/Merge (SESRDM) functions 300 while the sending endpoint within LAN 100 sends plaintext, ultimately intended for an endpoint within LAN 190, to the SESRDM 300 as well. SESRDM 300 XORs the plaintext with the keystream to derive the ciphertext. SESDRM 300 sends the keystream over a packet tunnel on the Cell Network 320 while splitting up the ciphertext across an IP tunnel on the MPLS Network 340 and an IP tunnel on the Satellite Network 360. These diverse paths 320, 340, and 360 deliver the keystream and the fragmented ciphertext to SESRDM 390. SESRDM 390 then XORs the keystream against the received ciphertext to derive the original plaintext. SESRDM 390 then passes on the plaintext to the intended destination endpoint within LAN 190. In a similar embodiment, the cipher stream could have been sent with the key stream split over two IP tunnels where IP tunnel involves a different network and network type (e.g. satellite and terrestrial). In still another embodiment involving four networks between the sender and the receiver—the cipher stream could have been fragmented over two paths and the cipher stream fragmented over two different paths involving IP tunnels.

Figure 4:
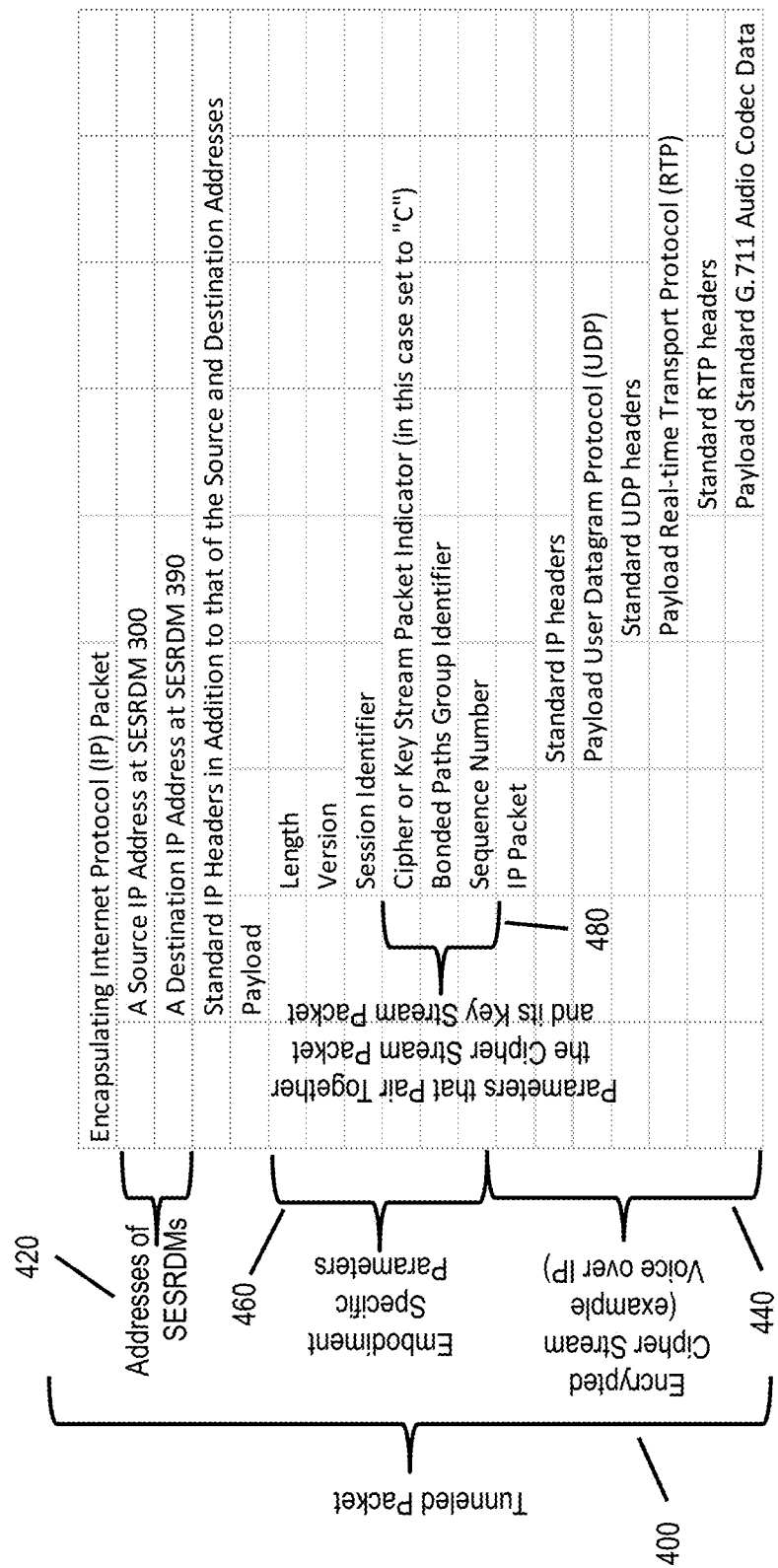
FIG. 4 is a block diagram illustrating in accordance to an embodiment the Cipher Stream packet.
Figure 5:
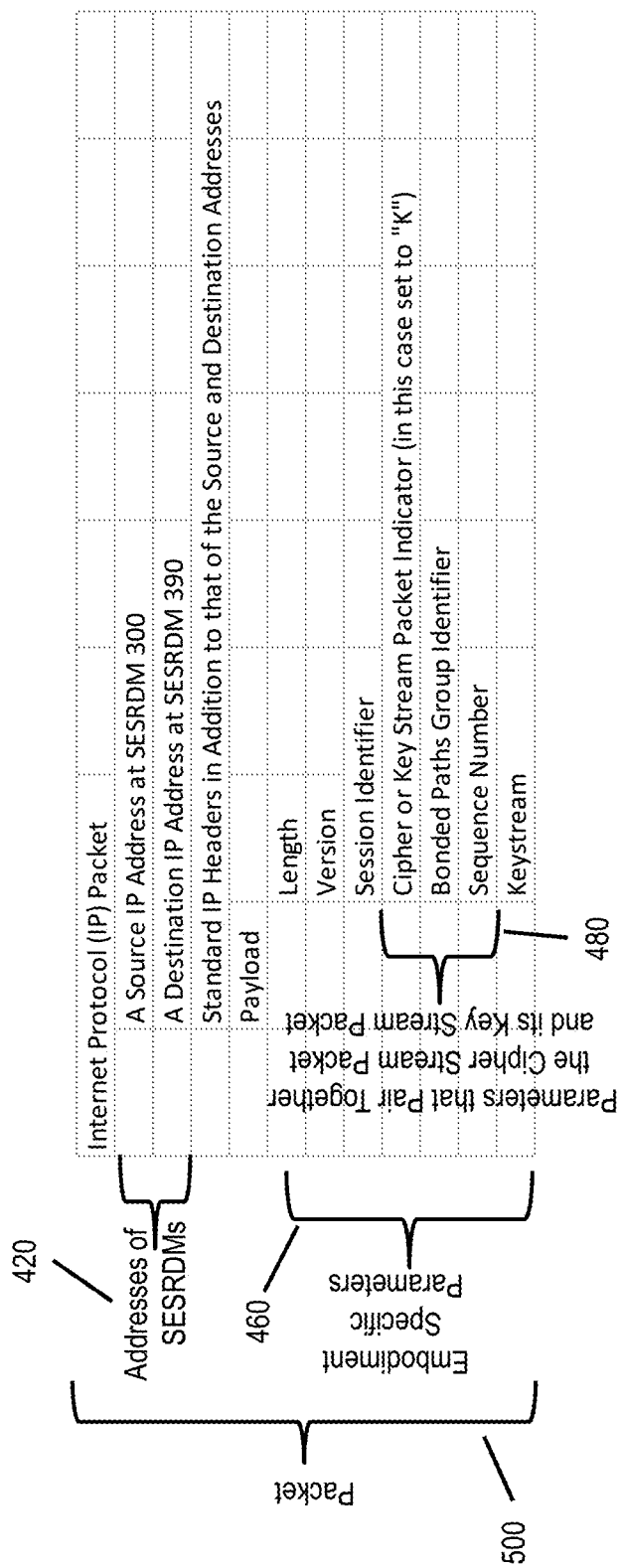
FIG. 5 is a block diagram illustrating in accordance to an embodiment the Key Stream packet.

FIG. 4 is a block diagram illustrating in accordance to an embodiment the Cipher Stream packet. In an embodiment illustrated by FIG. 4 a VoIP packet (e.g. IP/UDP/RTP) conveyed as a cipher stream encrypted packet 440 sits inside an encapsulating IP packet, also known as an IP Tunnel Packet, 400. The encapsulating IP Packet's source and destination addresses within 420 identify the source IP address of SESRDM 300 (the address of one of its one WAN access links) and the destination IP address of the SESRDM 390 (the address of one of its one WAN access links). In the FIG. 3 illustration there are three diverse paths between the two SESRDMs, thus there are three pairs of possible source and destination SESRMD addresses (and thus three diverse paths potentially spanning three different networks potentially spanning three different network types). In the context of FIG. 3 these 3 paths are the Cell Network 320, MPLS Network 340, and the Satellite Network 360. In FIG. 3 two diverse paths are reserved for use by the fragmented Cipher Stream transmission—MPLS Network 340 and Satellite Network 360. The third path in this example, explained in FIG. 5, is reserved for use by the Key Stream transmission. Each Cipher Stream packet per FIG. 4 would employ one of the two diverse paths reserved for the Cipher Stream transmission.

Many different algorithms may be employed to fragment the Cipher Stream between the two different paths. As an example one algorithm might be to send every other packet along each path. In a different example an algorithm randomly selects the path on a Cipher Stream packet by Cipher Stream packet basis. If four diverse paths are employed between the two SESRDMs, then there would be four pairs of source and destination SESRMD addresses addressing four different diverse paths. In FIG. 4 the Cipher or Key Stream Packet Indicator within 480 when set to "C" indicates a Cipher Stream packet (in this example the payload is an encrypted VoIP packet).

The Bonded Paths Group Identifier specifies the set of paths (pairs of source and destination SESRDM addresses) used to convey the separated Key Stream and the fragmented Cipher Stream communication. A SESRDM may connect with one or more SESRDMs. Between any two interconnected SESRMDs there may be one or more groups of bonded paths. Over the life of a communication the composition of bonded paths may change to further thwart unwanted interception. For these reasons there is the need for the Bonded Paths Group Identifier to differentiate amongst two or more groups of bonded paths between a pair of SESRDMs. At the destination SESRDM 390 for the given Bonded Paths Group Identifier, the Sequence Number within 480 is used to match the given Cipher Stream Packet with its decoding Key Stream Packet. This Sequence Number is also used to put the merged Cipher Stream packets back into proper order for final delivery to the destination endpoint.

FIG. 5 is a block diagram illustrating in accordance to an embodiment the Key Stream packet. In an embodiment illustrated by FIG. 5 Key Stream payload corresponding to a Cipher Stream packet is conveyed inside the IP Packet 500. Note that IP Packets 400 of FIG. 4 and 500 of FIG. 5 share the same headers but differ in the value of one of these headers and in their payload. Whereas Packet 400 in FIG. 4 served as an IP tunnel packet with an example VoIP IP/UDP/RTP packet payload encrypted as a cipher stream, IP Packet 500 in FIG. 5 conveys in its payload the corresponding Key Stream packet to be used by the destination SESRDM to decrypt the Cipher Stream packet back into plaintext. Whereas in Packet 400 in FIG. 4 Cipher or Key Stream Packet Indicator within 480 is set to "C" to indicate its Cipher Stream payload, in Packet 500 in FIG. 5 Cipher or Key Stream Packet Indicator within 480 is set to "K" to indicate its Key Stream payload. Packet 500's source and destination addresses within 420 identify the source address of the SESRDM 300 (one of its WAN access links) and the destination address of the SESRDM 390 (one of its WAN access links), that is, one diverse path within the plurality of diverse paths associated with the given Bonded Paths Group Identifier.

As stated in the description of the example embodiment in FIG. 3, if there are three diverse paths between the two SESRDMs, there will be three pairs of source and destination SESRMD addresses. FIG. 3 shows the three paths Cell Network 320, MPLS Network 340, and Satellite Network 360. The Key Stream packets employ the diverse path (e.g. a source and destination IP pair) associated with the Bonded Paths Group Identifier 480 value common to that of the associated fragmented Cipher Stream transmission but not employed by the fragmented Cipher Stream transmission. In FIG. 3 the Cell Network 320 conveys the Key Stream whereas MPLS Network 340 and Satellite Network 360 convey the fragmented Cipher Stream.

In a different embodiment if four diverse paths were to be employed between the two SESRDMs, then there would be four pairs of source and destination SESRMD addresses associated with the Bonded Paths Group Identifier within 480. As stated in the description of FIG. 4, at the destination SESRDM 390 the combination of the Bonded Paths Group Identifier and the Sequence Number within 480 is used to match the given Cipher Stream Packet where its Cipher or Key Stream Packet Indicator 480 is set to "C" with its decoding Key Stream Packet where its Cipher or Key Stream Packet Indicator 480 is set to "K". The Length parameter within parameter set 460 regarding the Tunneled Packet 400 and Packet 500 simply helps with the determination of the end of the packet and its parsing. The Session Identifier within parameter set 460 is an identifier identifying the original plaintext. Multiple simultaneous communications may share a common instance of bonded paths between SESRDM 300 and SESRDM 390 (e.g. same Bonded Paths Group Identifier within 480) but will not in the time in which they are processed share the same Sequence Number within 480.

Figure 6:
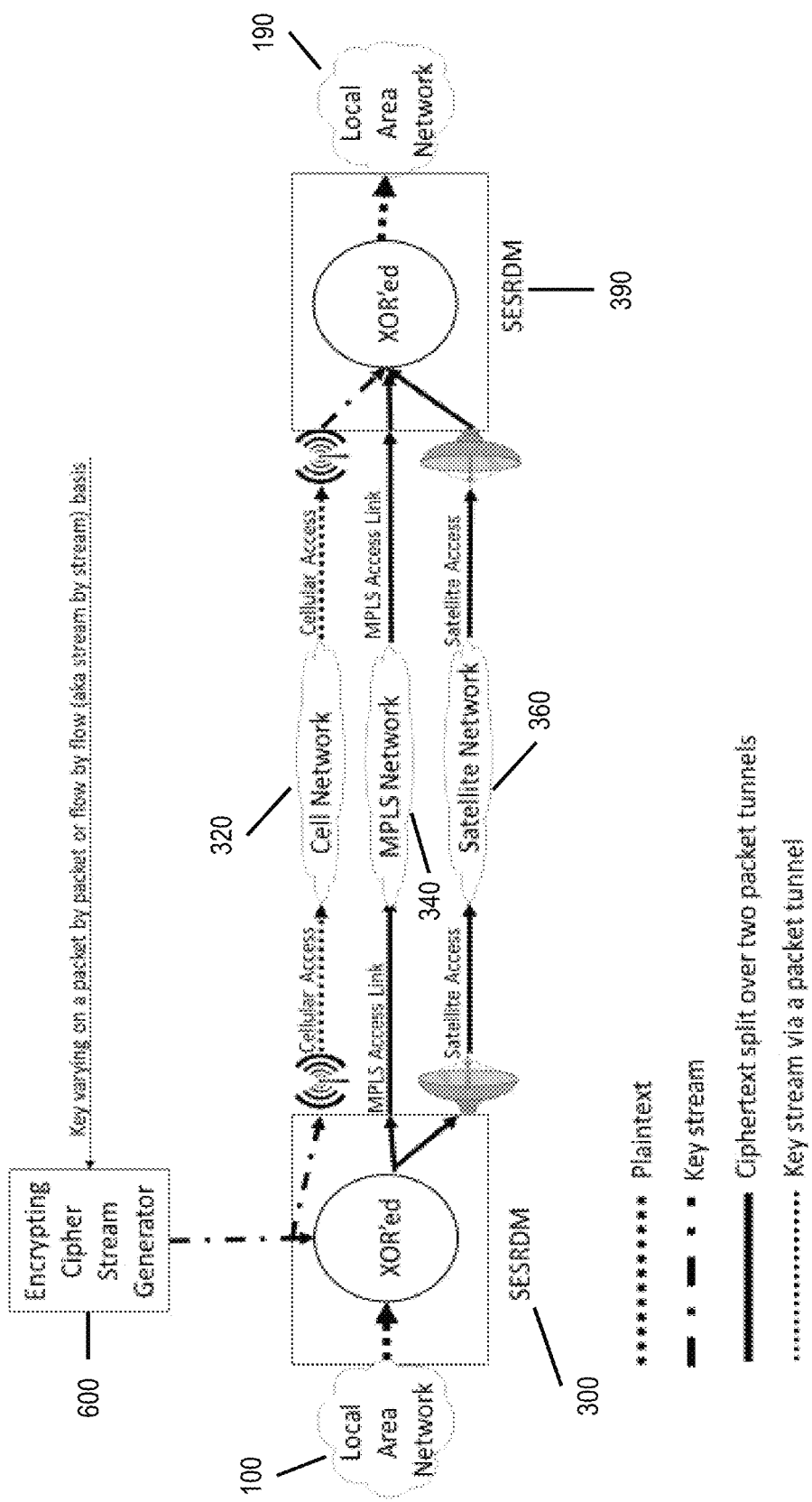
FIG. 6 is a block diagram illustrating in accordance to an embodiment where an encrypting key amongst a set of keys is applied on a per traffic flow by traffic flow or on a traffic packet by traffic packet basis.

FIG. 6 is a block diagram illustrating in accordance to an embodiment where an encrypting key amongst a set of keys is applied on a per traffic flow by traffic flow or on a traffic packet by traffic packet basis. In an embodiment illustrated by FIG. 6 the encryption key feeding into the Encrypting Cipher Stream Generator 600 varies on a per plain text stream or even vary on a per plain text stream packet basis in some embodiments.

Figure 7:
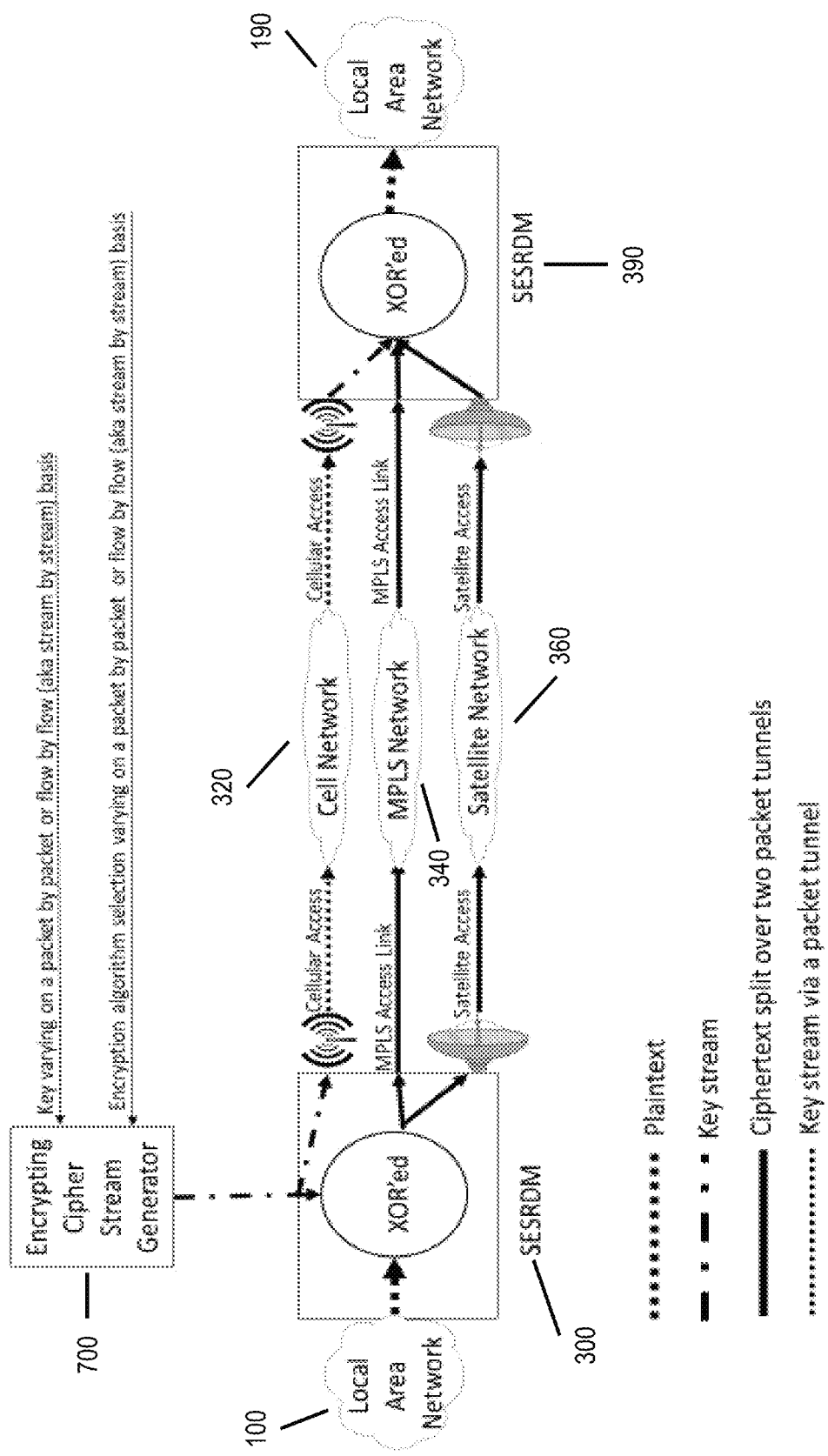
FIG. 7 is a block diagram illustrating in accordance to an embodiment where an encrypting algorithm amongst a set of encrypting algorithms is applied to the keys on a per traffic packet by traffic packet or traffic flow by traffic flow basis.

FIG. 7 is a block diagram illustrating in accordance to an embodiment where an encrypting algorithm amongst a set of encrypting algorithms is applied to the keys on a per traffic packet by traffic packet or traffic flow by traffic flow basis. In an embodiment illustrated by FIG. 7 the algorithm for the Encrypting Cipher Stream Generator 700 can be varied on a per plain text stream basis or even on a per plain text packet basis in some embodiments.

Figure 8:
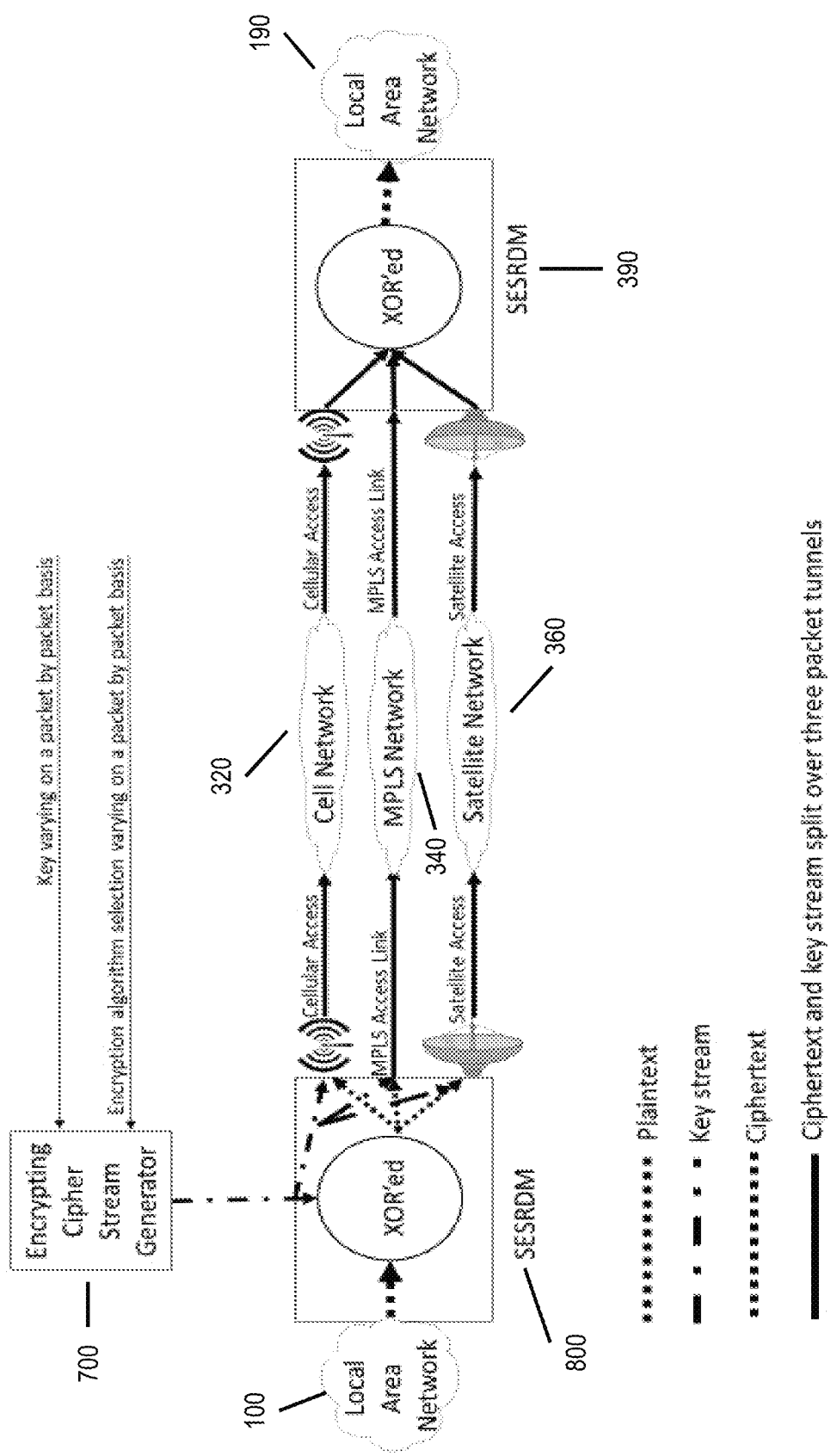
FIG. 8 is a block diagram illustrating in accordance to an embodiment where the ciphertext and key stream dispersed across diverse paths such that a given path contains both encrypted cipher stream packets and key stream packets but in such a way that an encrypted packet instance and its decrypting key stream packet instance pass through different IP tunnels.

FIG. 8 is a block diagram illustrating in accordance to an embodiment where the ciphertext and key stream dispersed across diverse paths such that a given path contains both encrypted cipher stream packets and key stream packets but in such a way that an encrypted packet instance and its decrypting key stream packet instance pass through different paths. In an embodiment illustrated by FIG. 8 the sending SESRDM 800 fragments both the Cipher Stream packets and the Key Stream packets across the three paths Cell Network 320, MPLS Network 340, and Satellite Network 360. If the fragmentation algorithm (e.g. random distribution) at SESRDM 800 sends a given Cipher Stream packet out on path MPL Network 340 then its corresponding Key Stream packet will be sent in accordance to the fragmentation algorithm (e.g. random distribution) over one of the two remaining paths, Cell Network 320 or Satellite Network 360.

Figure 9:
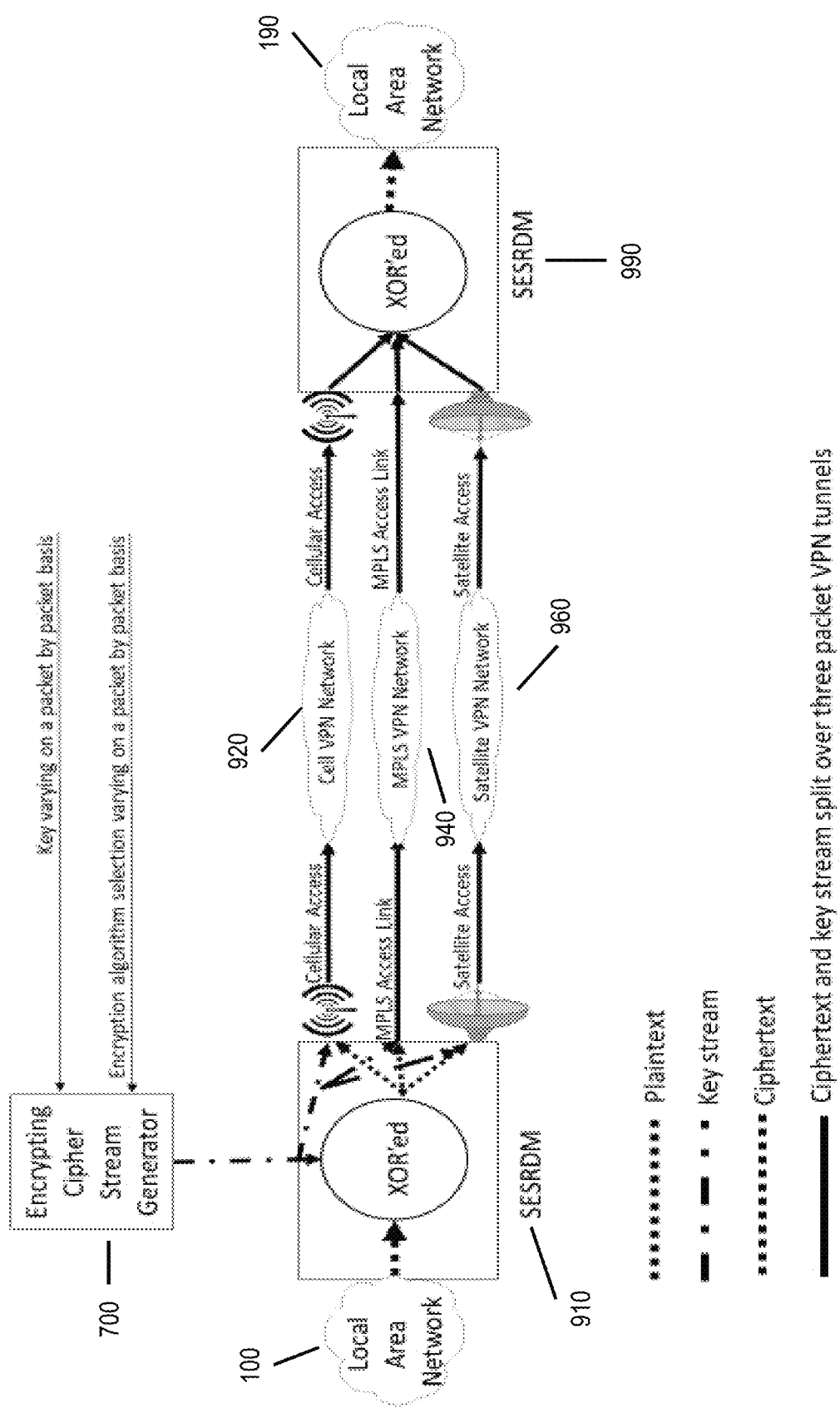
FIG. 9 is a block diagram illustrating in accordance to an embodiment where the paths between SESRDMs sit within IP VPN tunnels thus the communication is further encrypted.

FIG. 9 is a block diagram illustrating in accordance to an embodiment where the paths between SESRDMs sit within IP VPN tunnels thus the communication is further encrypted. In the previous specified embodiments FIG. 3, FIG. 6, FIG. 7, and FIG. 8 the Cipher Stream packets are encrypted but the Key Stream packets are not. In an embodiment illustrated by FIG. 9 encryption technology such as but not limited to the standard based and widely commercially available IPSec in either Transport or Tunnel mode is employed by the Cell VPN Network Path 920, MPLS VPN Network path 940, and Satellite VPN Network path 960. The Cipher Stream packets within each path is doubly encrypted whereas the Key Stream packets within each path is singly encrypted. An alternative embodiment would be to convey the Cipher Stream packets and Key Stream packets on different paths and then use VPN technology only on the paths conveying the Key Stream packets. For paths dedicated to Key Stream packet only transmission, such paths themselves could be encrypted using the described Cipher Streaming technology in which case the original Key Stream is turned into a Cipher Stream with its own Key Stream.

Figure 10:
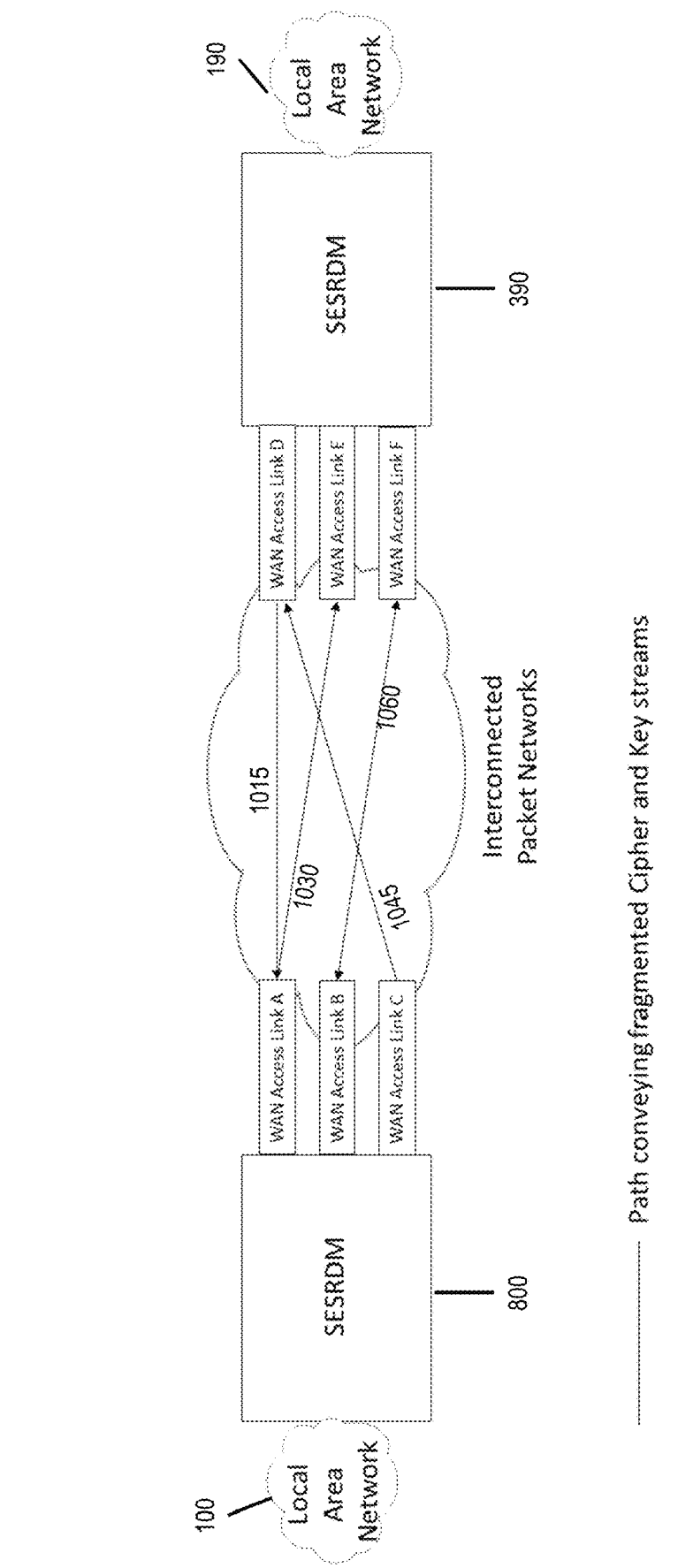
FIG. 10 is a block diagram illustrating in accordance to an embodiment where the bonded paths between pairs of SESRDMs may be unidirectional or bi-directional or a combination thereof and therefore vary by direction thereby further complicating the opportunity for unwanted interception of bidirectional communications.

FIG. 10 is a block diagram illustrating in accordance to an embodiment where the bonded paths between pairs of SESRDMs may be unidirectional or bi-directional or a combination thereof and therefore vary by direction thereby further complicating the opportunity for unwanted interception of bidirectional communications. In an embodiment illustrated by FIG. 10 in the direction from SESRDM 800 to SESRDM 390 the fragmented Key Stream and Cipher Stream packets convey over unidirectional path 1030, bidirectional path 1060, and unidirectional path 1045 whereas in the direction from SESRDM 390 to SESRDM 800 the fragmented Key Stream and Cipher Stream packets convey over unidirectional path 1015 and bidirectional path 1060. Such obfuscation by direction would make unwanted interception even more difficult for bidirectional communications such as two-party interactive voice calls.

Figure 11:
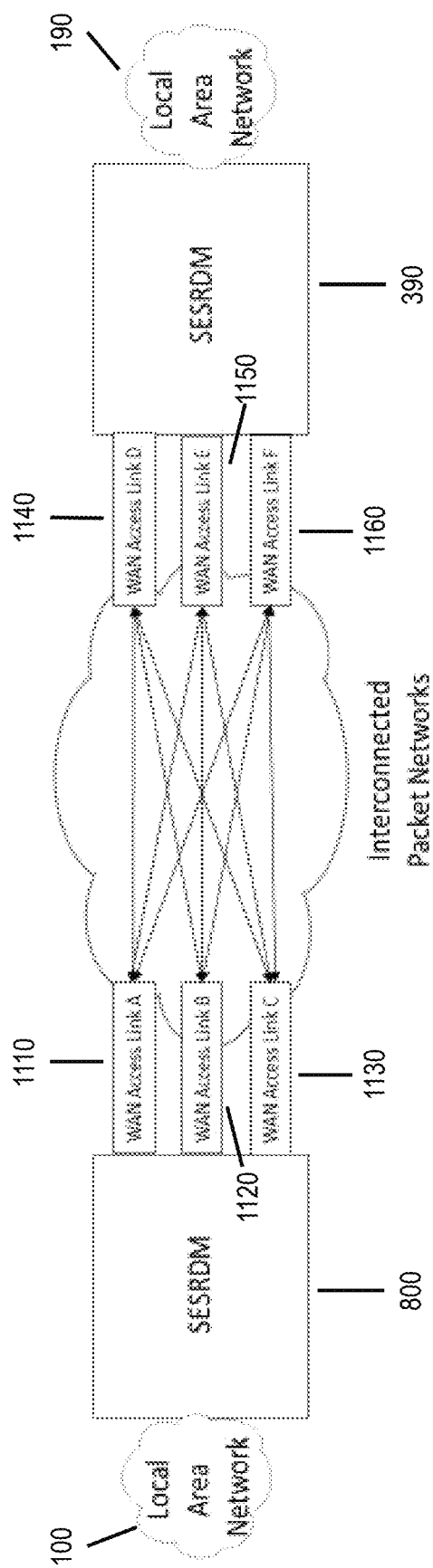
FIG. 11 is a block diagram illustrating in accordance to an embodiment the cipher text and cipher streams are fragmented across the full mesh of paths between SESRDMs thus further complicating the opportunity for unwanted interception.

FIG. 11 is a block diagram illustrating in accordance to an embodiment the cipher text and cipher streams are fragmented across the full mesh of paths between SESRDMs thus further complicating the opportunity for unwanted interception. In an embodiment illustrated by FIG. 11 SESRDM 800's WAN Access Link A 1110, WAN Access Link B 1120, and WAN Access Link C 1130 are fully meshed bidirectionally with SESDRM 390's WAN Access Link 1140, WAN Access Link E 1150, and WAN Access Link F 1160 resulting in a total of 9 bonded bi-directional paths. All 9 of these paths would be jointly employed by a single Bonded Paths Group Identifier instance within 480.

Figure 16:
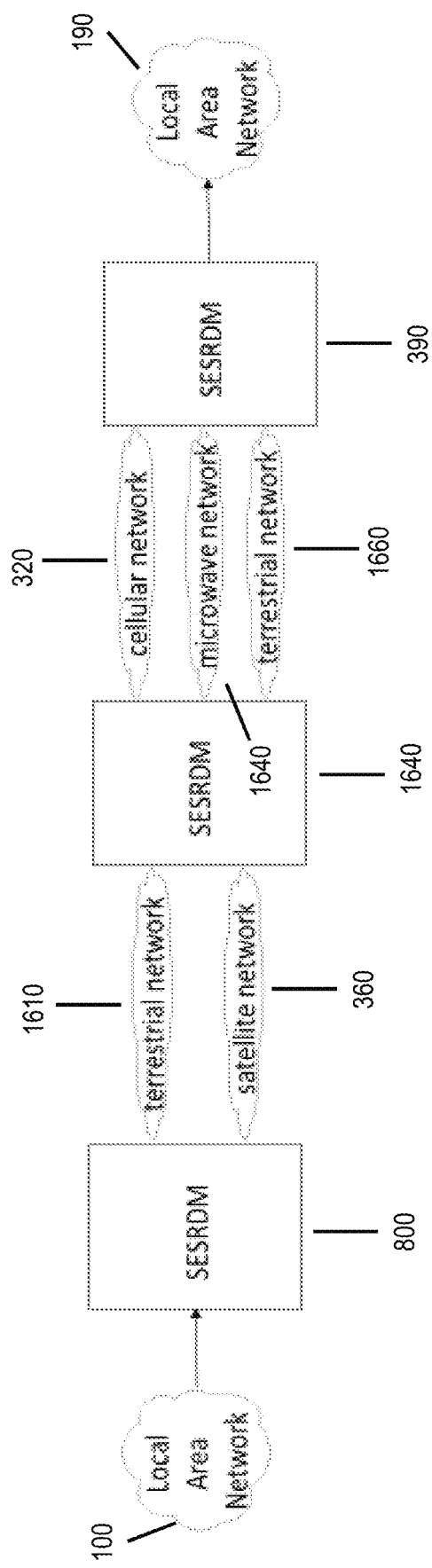
FIG. 16 is a block diagram illustrating in accordance to an embodiment of how a communication may include one or more intermediate SESRDMs between the sender's SESRDM and the receiver's SESRDM enabling the paths and the number of paths and even the networks to change as the communication moves away from the sender towards the receiver.

FIG. 16 is a block diagram illustrating in accordance to an embodiment of how a communication may include one or more intermediate SESRDMs between the sender's SESRDM and the receiver's SESRDM enabling the paths and the number of paths and even the networks to change as the communication moves away from the sender towards the receiver. In an embodiment illustrated by FIG. 16 showing the communication in the direction from Local Area Network 100 to Local Area Network 190, SESRDM 1640 sits between SESRDM 800 and SESRDM 390. Between SESRDM 800 and SESRDM 1640 the Key and Cipher Streams are fragmented between terrestrial network 1610 and satellite network 360. Between SESRDM 1640 and SESRDM 390 the Key and Cipher Streams are fragmented amongst cellular network 320, microwave network 16, and terrestrial network 1660. Note that if the fragmentation algorithm performed by SESRDM 800 and SESRDM 1640 performs random distribution then in the direction from Local Area Network 100 towards Local Area Network 190 terrestrial network 1610 and satellite network 360 will each handle approximately 50% of the fragmented Cipher and Key Stream packets whereas cellular network 320, microwave network 1640, and terrestrial network 1660 will each handle approximately one third of the fragmented Cipher and Key Stream packets.

Figure 12:
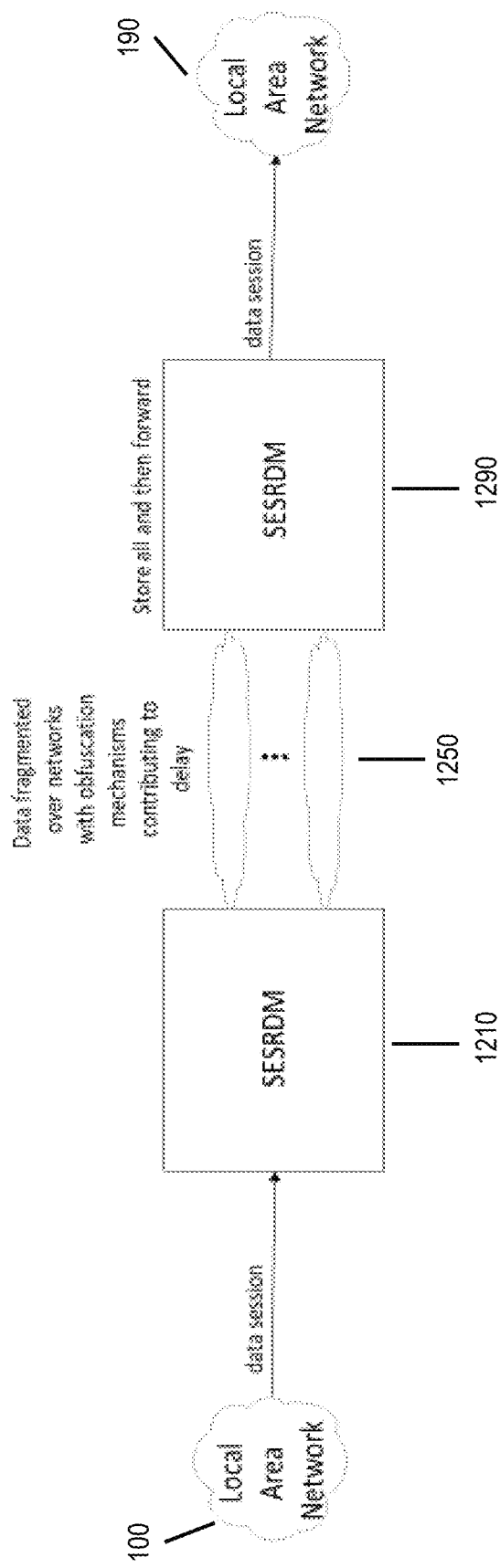
FIG. 12 is a block diagram illustrating in accordance to an embodiment of how in the context of non-real-time communications the sending SESRDM serially transmits the Cipher and Key Stream packet pairs fragmented across diverse paths with varying intentional latency on a packet pair by packet pair basis and thus the destination SESRDM accumulates and stores the received packet pairs for subsequent cipher text decryption to plain text and merge before delivery to the intended endpoint.

FIG. 12 is a block diagram illustrating in accordance to an embodiment of how in the context of non-real-time communications the sending SESRDM serially transmits the Cipher and Key Stream packet pairs fragmented across diverse paths with varying intentional latency on a packet pair by packet pair basis and thus the destination SESRDM accumulates and stores the received packet pairs for subsequent cipher text decryption to plain text and merge before delivery to the intended endpoint. In an embodiment illustrated by FIG. 12 in the context of non-real-time communications in the direction from Local Area Network 100 to Local Area Network 190, SESRDM 1210 intentionally varies the serial sending of the fragmented Key Stream and Cipher Stream packet pairs across the diverse paths 1250 to SESRDM 1290. SESRDM 1290 accumulates and stores the communication transcribing it back to plain text after receipt of both the Cipher Stream packet instance and its corresponding Key Stream packet instance and forwarding when complete to the intended destination attached to Local Area Network 190.

Figure 13:
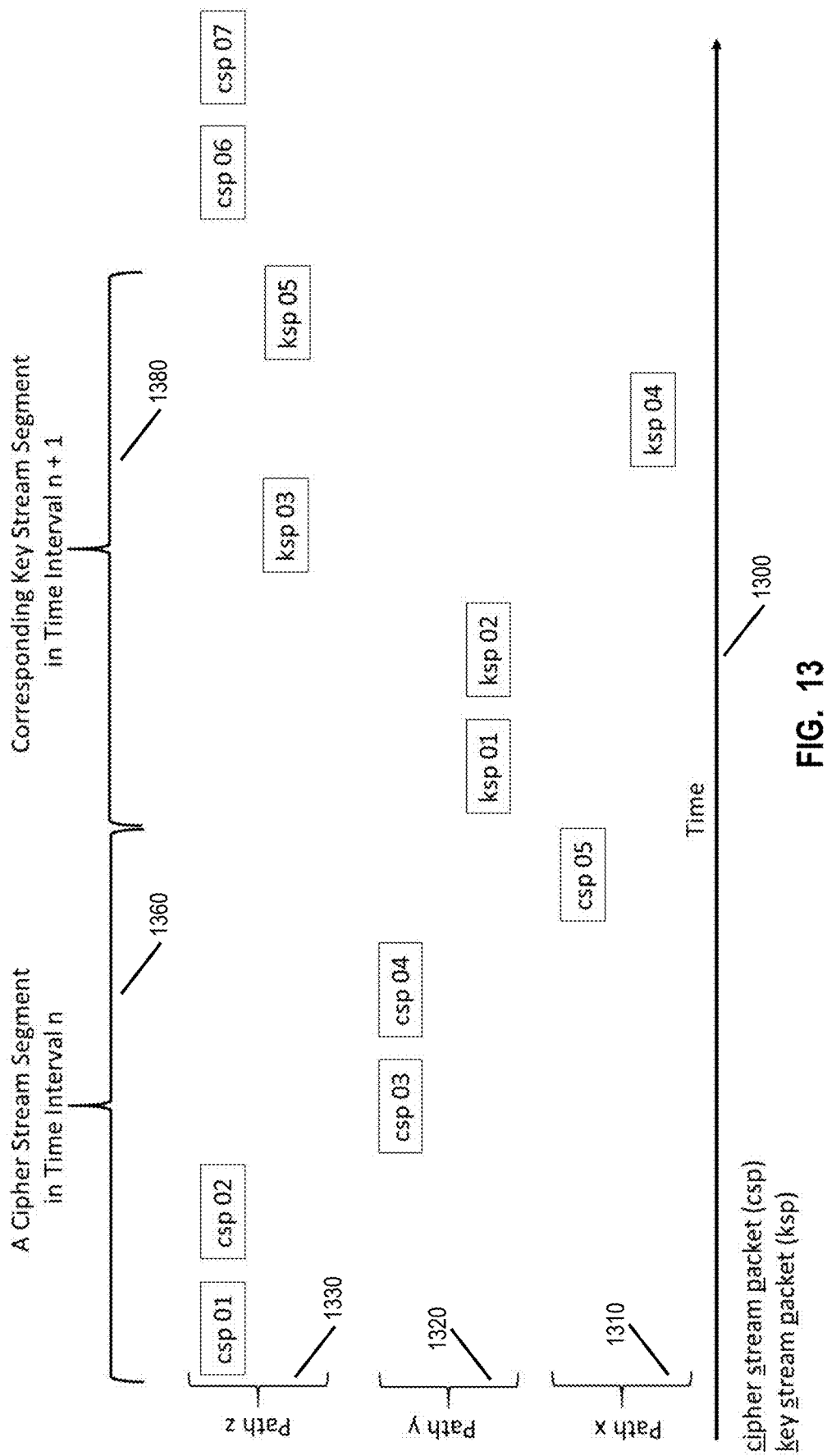
FIG. 13 is a block diagram illustrating in accordance to an embodiment the delay-based obfuscation between a cipher stream packet and its corresponding key stream packet showing that the cipher stream packets intentionally precede their corresponding decrypting key stream packets.

FIG. 13 is a block diagram illustrating in accordance to an embodiment the delay-based obfuscation between a cipher stream packet and its corresponding key stream packet showing that the cipher stream packets intentionally precede their corresponding decrypting key stream packets. In an embodiment illustrated by FIG. 13 in one direction over time 1300 in the context of non-real-time communications a Cipher Stream segment in Time Interval 1360 is fragmented across the paths x 1310, y 1320, and z 1330. The corresponding Key Stream also fragmented across paths x 1310, y 1320, and z 1330, but in a way such that any given Cipher Text packet takes a different path from its corresponding Key Stream packet, is sent in a subsequent time interval 1380. The receiving SESRDM accumulates the Cipher and Key Stream packet pairs arriving over different paths over different time intervals and then decrypts and merges the complete plain text before delivery to the intended destination.

Figure 14:
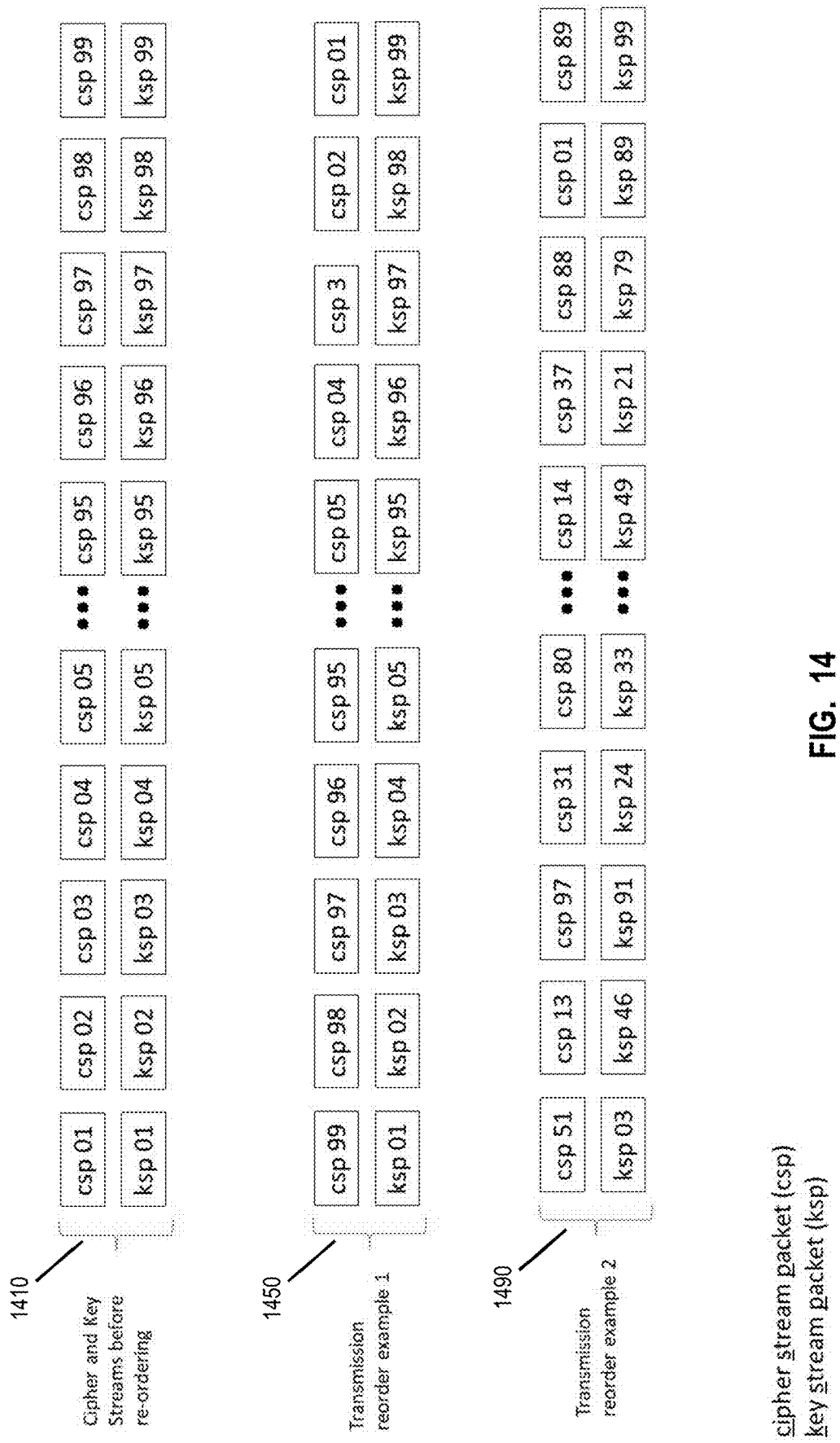
FIG. 14 is a block diagram illustrating in accordance to an embodiment of how the ordering of the non-real time Cipher Stream and Key Stream packets can be re-ordered to increase obfuscation.

FIG. 14 is a block diagram illustrating in accordance to an embodiment of how the ordering of the non-real time Cipher Stream and Key Stream packets can be re-ordered to increase obfuscation. In an embodiment illustrated by FIG. 14 in the context of non-real-time communications 1410 shows the natural ordering of the Cipher Stream and Key Stream packets. 1450 shows an example of how the Cipher Stream Packets may be sent in reverse order and the Key Stream packets sent in natural order. Per another embodiment 1490 shows a random ordering of the transmission of both the Key Stream and Cipher Stream packets. The receiving SESRDM accumulates all of the Cipher Stream and Key Stream packets and then decrypts the Cipher Text into clear text, properly reorders the packets and then forwards to the intended destination. Note that the fragmentation across diverse paths is not depicted for the purpose of simplifying the illustration.

Figure 15:
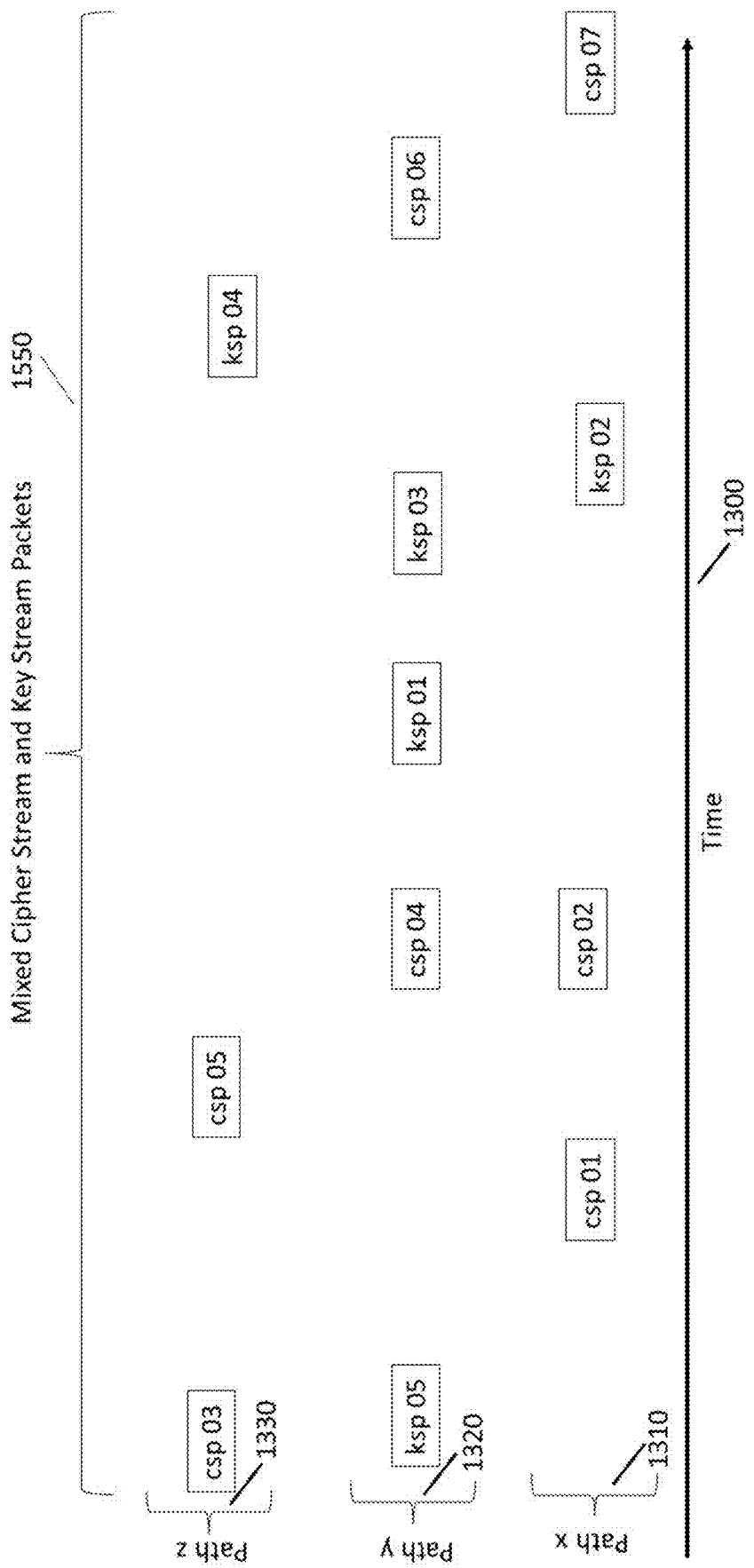
FIG. 15 is a block diagram illustrating in accordance to an embodiment using differences in both the ordering and the sending time of the ciphertext and corresponding key stream packets to further complicate unwanted interception and subsequent decryption.

FIG. 15 is a block diagram illustrating in accordance to an embodiment using differences in both the ordering and the sending time of the ciphertext and corresponding key stream packets to further complicate unwanted interception and subsequent decryption.

In an embodiment illustrated by FIG. 15 in the context of non-real-time communications over Time 1300 the Cipher Stream and Key Stream packets 1550 are scrambled within stream and between these two streams and subsequently fragmented across Path x 1310, Path y 1320, and Path z 1330 such that a given cipher stream packet and its corresponding decoding key stream packet do not traverse the same path. Path selection state for the Cipher Stream packet and is corresponding Key Stream packet must be maintained until both are sent to ensure that the same path is not used for both transmissions. The receiving SESRDM accumulates the Cipher and Key Stream packets arriving over different paths over different time intervals and then decrypts and merges the complete plain text before delivery to the intended destination. The scrambling of the Cipher and Key Stream packets must not be so severe as to result in transmission timeouts of the underlying transport protocol stack (e.g. IP/TCP) unless the SESRDMs undertake responsibility per existing technology for guaranteed delivery by resending lost packets (e.g. TCP processing) and sending keep alives to keep the transaction alive in face of the intentionally delayed transmission.

Although processes, equipment, and data structures are depicted as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. Although data structures, messages and fields are depicted as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

Note that the detailed description above and the associated figures oftentimes shows the SESRDM as an edge element beside a LAN. Note that the SESRDM can also sit at the edge of a cloud computing or cloud storage associated data center. A SESRDM could also be installed in endpoints that are capable of simultaneously employing two or more WAN side access links. Though such endpoint devices are not common today they may be so in the future. Contemporary examples are cell phones equipped with two SIM cards that are able to use both SIM cards simultaneously also known as Dual SIM Dual Voice over Long Term Evolution (VoLTE). Another example would be a mobile laptop or tablet that has a cable ethernet port, a cellular port, and a WiFi port where two of or all three can be used simultaneously. The claims will collectively refer to all such elements that might house the SESRDM function as a "node".

On a scheduled or even a random basis the paths comprising a Bonded Paths Group Identifier instance can change through re-provisioning to further thwart unwanted interception or to respond to changing network conditions (e.g. loss of a path or very poor quality on a path). For instance, a given Bonded Paths Group Identifier instance involving SESRDM 800 and SESRDM 390 may at one point in time consist of the paths depicted by FIG. 10 but may dynamically mid-communication change to that of paths depicted by FIG. 11.

2. Method

Although steps are depicted as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. The steps are organized into four parallel finite state machines (e.g. being defined below 1700, 1800, 1900, 2000). Each finite state machine embodiment is a process. The host operating system time slices amongst these processes, taking prioritization into account, to enable parallel execution of these finite state machines. One finite state machine applies to the SESRDM performing in the sending mode (e.g. 1700) to the other SESRDM. The other three finite state machines (1800, 1900, 2000) apply to the SESRDM performing in the receiving from a SESRDM mode. Three of these finite state machines (1700, 1800, and 2000) run at a high priority. One finite state machine (1900) which regards house cleaning (eliminating expired queued packets) runs at a relatively lower priority.

Figure 17:
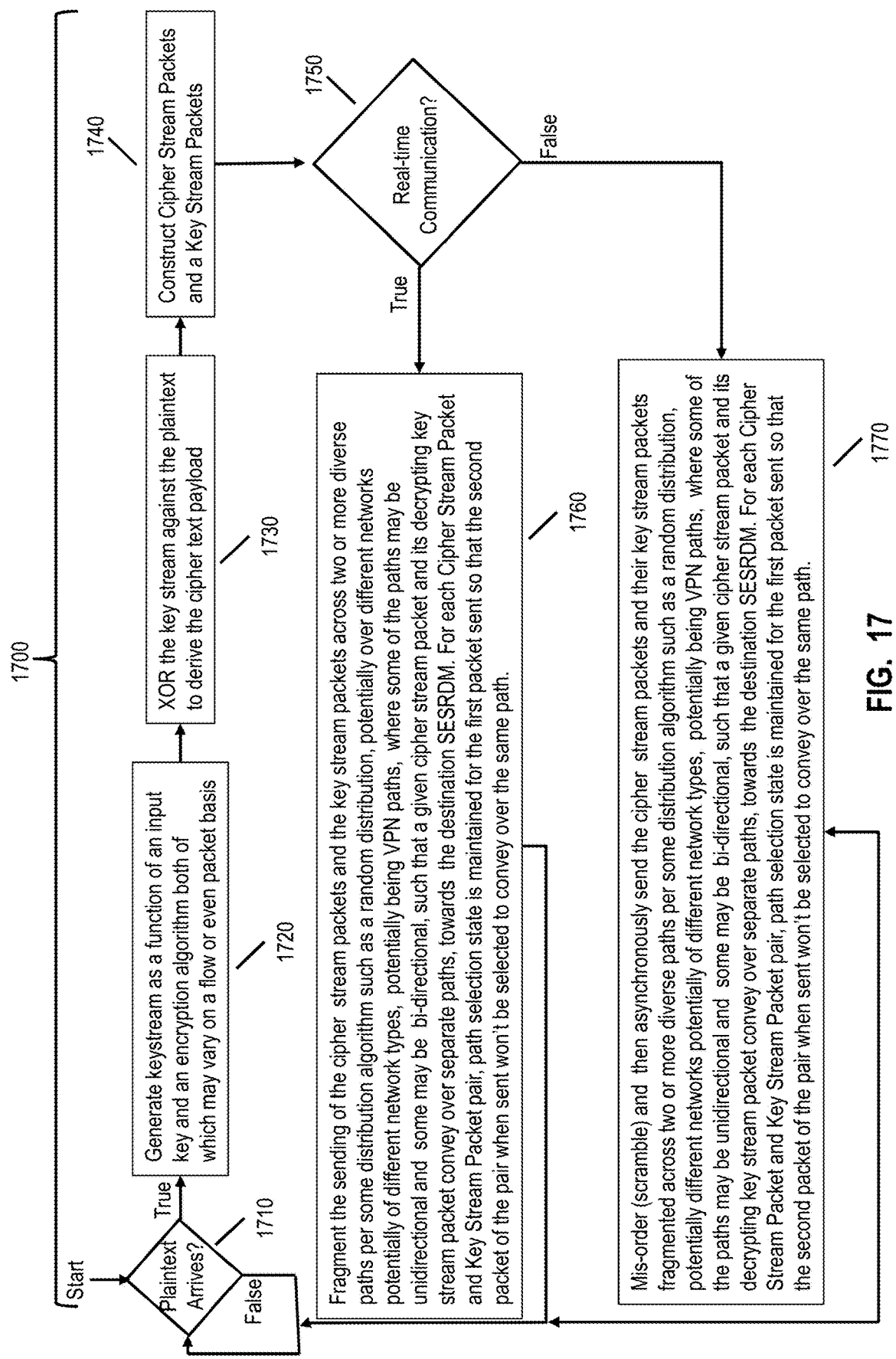
FIG. 17 is a block diagram that illustrates the high priority finite state machine for the SESRDM as the receiver of plaintext and the sender of the cipher and key streams.

FIG. 17 is a block diagram illustrating in accordance to an embodiment the high priority finite state machine for the SESRDM as the receiver of plaintext and the sender of the cipher and key streams. In an embodiment illustrated by FIG. 17, 1700 is the high priority finite state machine for a SESRDM process collectively spanning 300, 800, and 1210 as the receiver of plaintext and the sender of the Cipher and Key Streams. This finite state machine 1700 within the SESRDM (300, 800, or 1210) per 1710 awaits the arrival of plaintext from the original sender.

Per step 1720 using as input the key and the encryption function, either of which may vary on a flow or even packet basis, the Encrypting Cipher Stream Generator (200, 600 or 700) generates the Key Stream. Per 1730 the Key Stream is XORed against the Plaintext to derive the Cipher Text payload. The Key Stream is inserted as the payload to Key Stream Packets (note 480 Cipher or Key Stream Packet Indicator set to "K") and the Cipher Stream is inserted as payload to the Cipher Stream Packets (note 480 Cipher or Key Stream Packet Indicator set to "C"). Note that the Cipher Stream Packet and Key Stream Packet pair share the same values for the 480 Bonded Paths Group Identifier and 480 Sequence Number. More obfuscation features are available to non-real-time communications relative to real-time communications.

Step 1750 branches on the next step depending upon whether or not the communications is real-time or non-real-time. In the IPv4 environment the Differentiated Services Code Point (DSCP) field and in IPv6 environment the Traffic Class header might be used to identify what is real-time versus non-real-time. An example of real-time communications is the IP/UDP/RTP stack used where the DSCP per IP industry standard in the IPv4 context is generally set to 46 for Expedited Forwarding handling for real-time audio and video transmissions. An example of non-real-time communications is the IP/TCP stack used for instance for non-realtime communications such as email transmissions; in the IPv4 context its DSCP is often set to 0 for Best Effort handling.

If the Cipher Stream regards real-time communication then step 1760 executes employing the functionality illustrated in FIGS. 4 and 5 and the functionality or a subset of the functionality illustrated by FIGS. 3, 6-11, and 16. The fragmentation may span two or more bi-directional and/or unidirectional paths between SESRDMs. These paths may span different networks and different network types.

If the Cipher Stream regards non-real-time communication then step 1760 executes employing the functionality or subset thereof illustrated in FIGS. 3 and 6-16. The fragmentation may span two or more bi-directional and/or unidirectional paths between SESRDMs. These paths may span different networks and different network types. Note that for both real-time and non-real-time communications path selection state must be maintained for the first packet sent so that any given pair of Cipher Stream and Key Stream Packets are fragmented onto separate diverse paths. Once the second packet within the Cipher Stream Packet/Key Stream Packet pair is sent, this path selection state is abandoned by the sending SESRDM. This finite state machine then goes back to step 1710 to await the arrival of more Plaintext.

Figure 18:
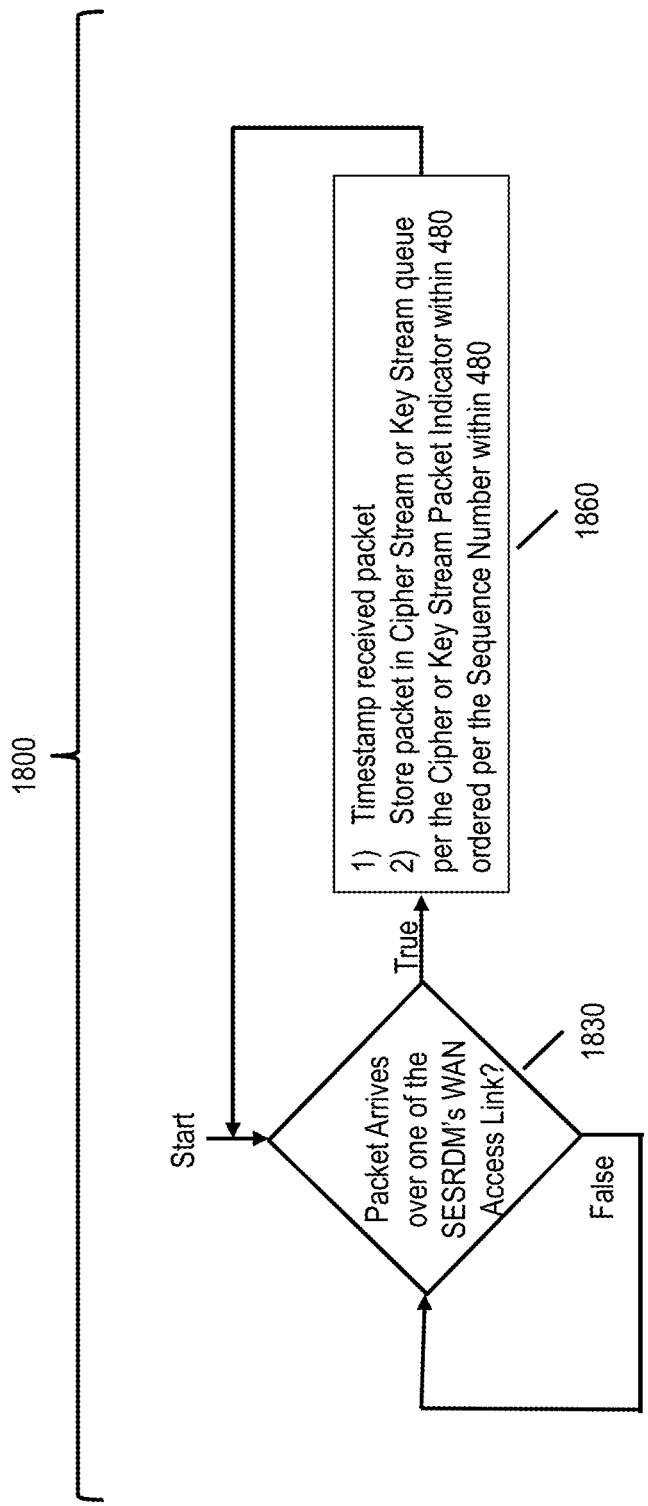
FIG. 18 is a block diagram that illustrates the high priority finite state machine for the SESRDM receiving Cipher Stream and Key Stream Packets.

FIG. 18 is a block diagram that illustrates the high priority finite state machine for the SESRDM receiving Cipher Stream and Key Stream Packets. In an embodiment illustrated by FIG. 18, 1800 is the high priority finite state machine for a SESRDM process that timestamps and stores Cipher Stream and Key Stream packets received over two of more diverse paths. In 1830 this finite state machine awaits the arrival of a Cipher Stream or Key Stream packet over one of the receiving SESRDM's WAN Access Links. Per 1860 the received packet is timestamped. It is then stored in either its Cipher Stream or Key Stream queue per the Ciper or Key Stream Packet Indicator within 480 ordered per the Sequence Number within 480. The finite state machine then returns again to step 1830 awaiting new input.

Figure 19:
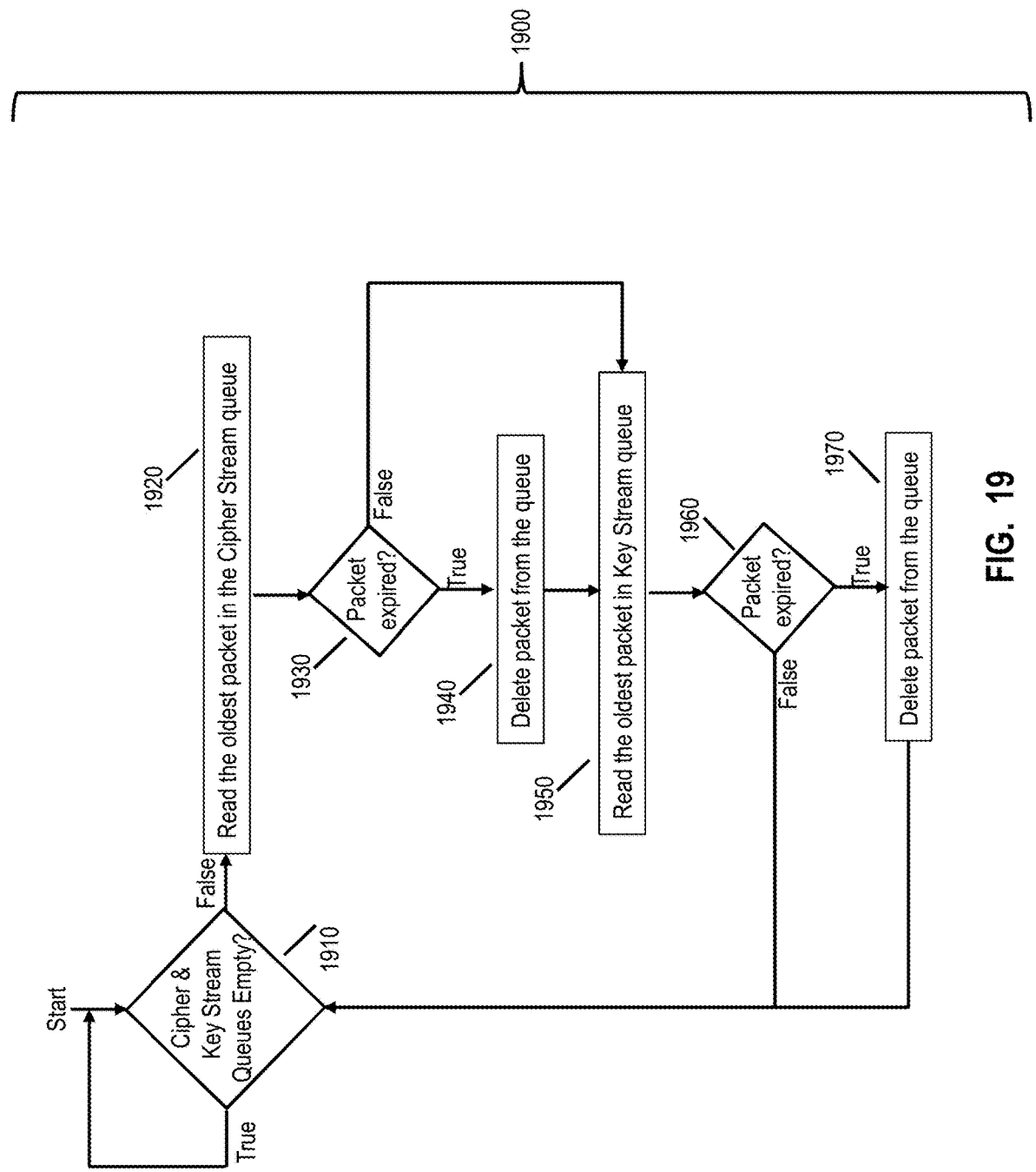
FIG. 19 is a block diagram that illustrates the lower priority finite state machine for the SESRDM performing housekeeping of its Cipher Stream and Key Stream queues.

FIG. 19 is a block diagram that illustrates the lower priority finite state machine for the SESRDM performing housekeeping of its Cipher Stream and Key Stream queues. In an embodiment illustrated by FIG. 19, 1900 is the high priority finite state machine for a SESRDM process that maintains the Cipher and Key Stream queues. If per 1910 the queues are not empty, then per 1920 the oldest Cipher Stream packet is read. Step 1930 determines if this packet has expired per a configurable age. If true step 1940 deletes it. Then in step 1950 the oldest packet in the Key Stream queue is read. Step 1960 determines if this packet has expired per a configurable age. If true step 1970 deletes it. The finite state machine then returns again to step 1910. If the deleted packets are associated with guaranteed delivery (e.g. TCP based service), then the transaction fails and will trigger a re-send. If the deleted packets are associated with non-guaranteed delivery (e.g. IP/UDP/RTP stack based Voice and Video over IP), then the deleted packets results in packet loss (and a loss of transmission quality).

Figure 20:
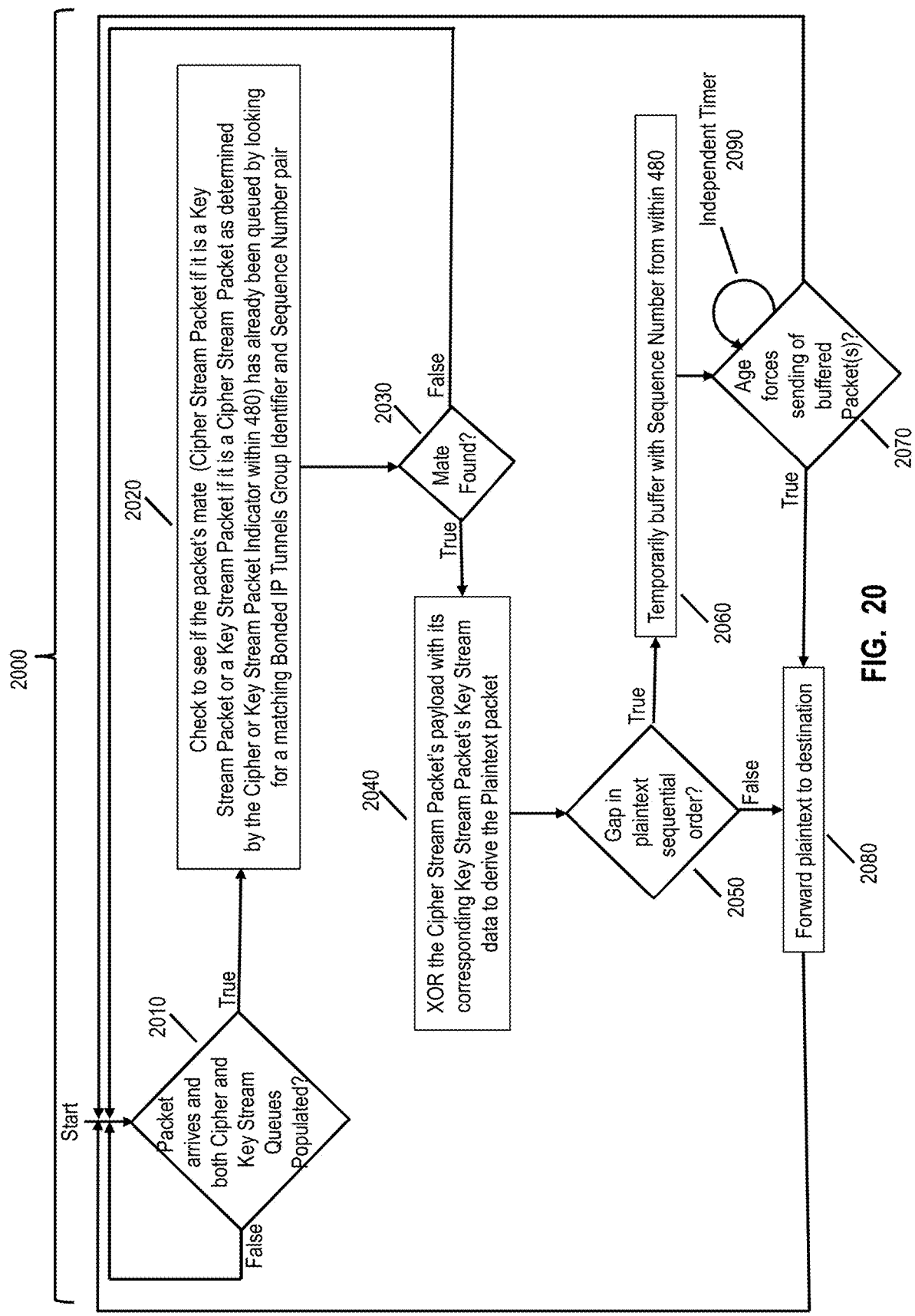
FIG. 20 is a block diagram that illustrates the high priority finite state machine for the SESRDM decoding the received Cipher Stream Packets back into Plaintext for subsequent delivery to the destination.

FIG. 20 is a block diagram that illustrates the high priority finite state machine for the SESRDM for decoding the received Cipher Stream Packets back into Plaintext for delivery to the destination endpoint. In an embodiment illustrated by FIG. 20, 2000 is the high priority finite state machine for a SESRDM process that decrypts the received Cipher Stream Packet. When a packet arrives at step 2010 and if both the Cipher and Key Stream queues are populated, in step 2020 the mate to the received packet is sought. The Cipher or Key Stream Packet Indicator 480 determines if the new packet is a Cipher Stream Packet (value "C") or a Key Stream Packet (value "K"). If the received packet has a value "C", then a read attempt is made against the Key Stream Packet queue. If the received packet has a value "K", then a read attempt is made against the Cipher Stream Packet queue.

An attempt is made in steps 2020 and 2030 to match both the Bonded Paths Group Identifier value and the Sequence Number. If a match is made, then in step 2040 the Key Stream is XOR'ed against the Cipher Stream to yield the Plaintext packet. If there isn't a gap (the previous Plaintext packet was previously sent) per 2050, the current Plaintext packet is forwarded to the destination in step 2080 and the finite state machine returns to step 2010.

If the previous Plaintext packet (Sequence Number 480 minus 1) has not yet been received as determined by step 2050, then in step 2060 the currently being processed Plaintext packet is temporarily stored in a buffer to await the missing Plaintext packet predecessor. If the communication is real-time (e.g. Plaintext is for instance IP/UDP/RTP), the provisioned wait will be very small (e.g. less than 100 milliseconds for voice and video). If the communication is non-real-time (e.g. IP/TCP stack), the provisioned wait time may be longer. If the optional obfuscation capabilities as described in the descriptions of FIGS. 12-15 are in use, the provisioned wait times may be substantially longer and may even require keep alive processing to keep transactions alive with these keep alive mechanisms involving per prior art (e.g. TCP keepalive, HTTP keepalive).

If the buffered packets have not hit an age threshold, step 2070 branches back to step 2010. If a buffered packet has hit an age threshold, then in step 2080 the plaintext is forwarded to the destination and the finite state machine returns to step 2010.

Note that if the last decrypted plaintext packet fills a gap in the Sequence Numbers per 2060, which caused temporary storage in the temporary buffer, two or more plaintext packets from this buffer may be forwarded to the destination in step 2080. Also note that an independent timer 2090 runs in the background forcing the 2070 evaluation. Even if the rest of this finite state machine 2000 is awaiting the arrival of a new packet in step 2010, step 2070 will be triggered when its independent timer 2090 fires. Timer 2090 automatically resets after it fires.

Note that the finite state machines associated with FIGS. 17-20 also apply to the intermediate SESRDM 1640 of FIG. 16 in which case they apply to both sides—the side facing SESRDM 800 as well as the side facing SESRDM 390. For traffic in the direction from LAN 100 to LAN 190 in FIG. 16 between SESRDM 800 and SESRDM 1640 the finite state machines 1800 per FIG. 18, 1900 per FIG. 19, and 2000 per FIG. 20 apply to SESRDM 1640. In continuation of the traffic in the direction from LAN 100 to LAN 190 in FIG. 16 between SESRDM 1640 and SESRDM 390 the finite state machine 1700 per FIG. 17 applies to SESRDM 1640. For traffic in the direction from LAN 190 to LAN 100 in FIG. 16 between SESRDM 390 and SESRDM 1640 the finite state machine 1700 per FIG. 17 applies to SESDRM 1640. In continuation of the traffic in the direction from LAN 190 to LAN 100 in FIG. 16 between SESRDM 1640 and SESRDM 800 the finite state machines 1800 per FIG. 18, 1900 per FIG. 19, and 2000 per FIG. 20 apply to SESRDM 1640.

Alternatively to what is described in the previous paragraph SESRDM 1640 in FIG. 16 could bypass the decrypton and re-encryption steps specified in the finite state machines 1700 in FIGS. 17 and 2000 in FIG. 20 and simply pass along in both directions the received Cipher Stream and Key Stream packets by only changing their source and destination addresses within 420 in FIG. 4 and FIG. 5. In such a mode the SESRDM 1640 is simply mapping traffic from one set of paths on its one side to a different set of paths on its other side. In the context of FIG. 16 the SESRDM would simply be mapping Cipher and Key Stream packets between terrestrail network 1610 and satellite network 360 on one side and cellular network 320, microwave network 1640, and terrestrial network 1660 on the other side and vice versa in the other direction. The previous paragraph's description which involves the intermediate SESRDM also decrypting what it receives and then re-encrypting what it sends via its own encryption algorithm and key or keys input is more secure in that the encryption of the Cipher Stream packets and its associated Key Stream packets changes at the intermediate SESRDM.

3. Networking Hardware Overview

Figure 21:
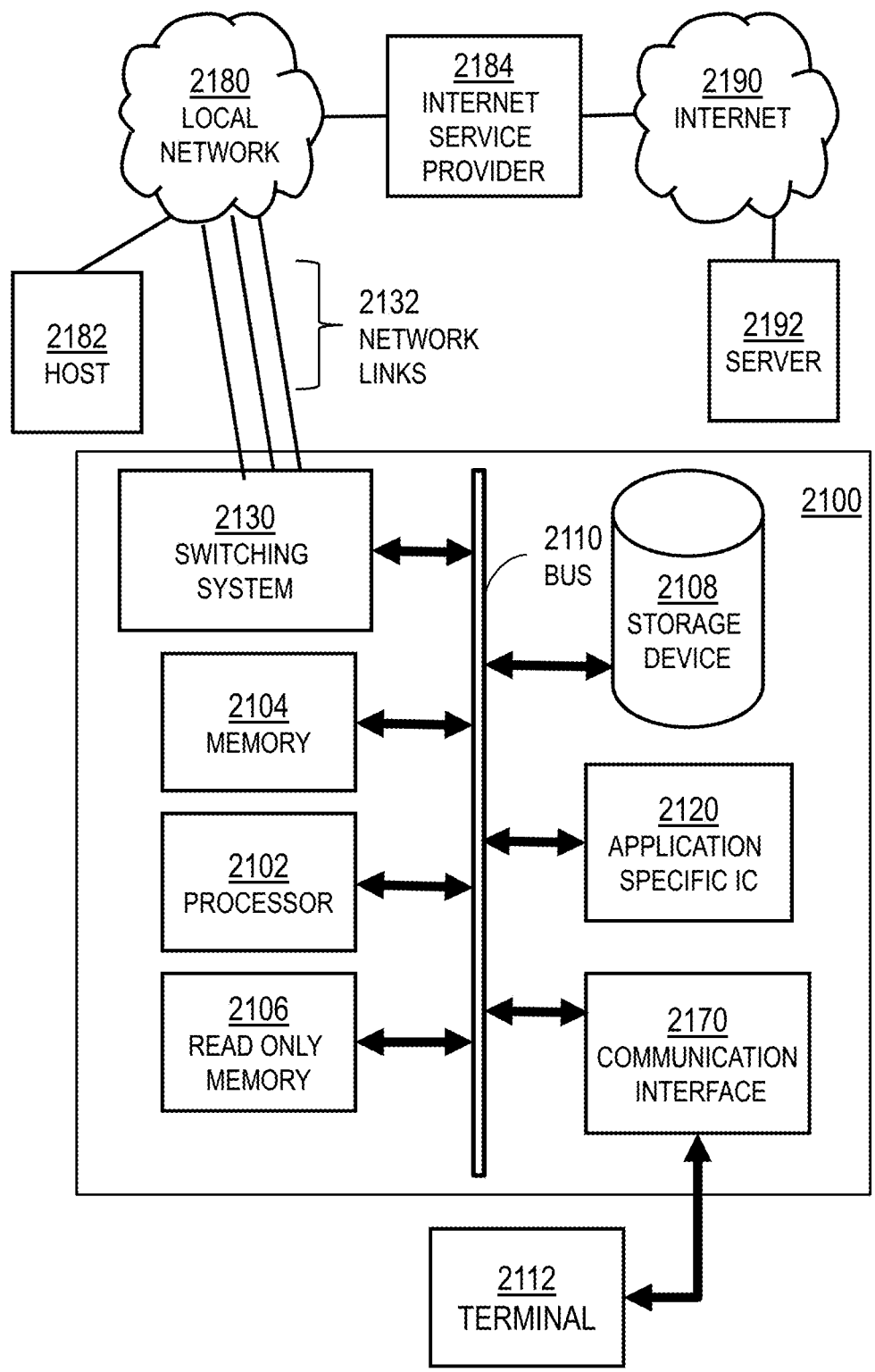
FIG. 21 is a block diagram that illustrates a computer system upon which an embodiment of the invention may be implemented.

FIG. 21 is a block diagram that illustrates a computer system 2100 upon which an embodiment of the invention may be implemented. Computer system 2100 includes a communication mechanism such as a bus 2110 for passing information between other internal and external components of the computer system 2100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 2100, or a portion thereof, constitutes a means for performing one or more steps of one or more methods described herein.

A sequence of binary digits constitutes digital data that is used to represent a number or code for a character. A bus 2110 includes many parallel conductors of information so that information is transferred quickly among devices coupled to the bus 2110. One or more processors 2102 for processing information are coupled with the bus 2110. A processor 2102 performs a set of operations on information. The set of operations include bringing information in from the bus 2110 and placing information on the bus 2110. The set of operations also typically include comparing two or more units of information, shifting positions of units of information, and combining two or more units of information, such as by addition or multiplication. A sequence of operations to be executed by the processor 2102 constitutes computer instructions.

Computer system 2100 also includes a memory 2104 coupled to bus 2110. The memory 2104, such as a random access memory (RAM) or other dynamic storage device, stores information including computer instructions. Dynamic memory allows information stored therein to be changed by the computer system 2100. RAM allows a unit of information stored at a location called a memory address to be stored and retrieved independently of information at neighboring addresses. The memory 2104 is also used by the processor 2102 to store temporary values during execution of computer instructions. The computer system 2100 also includes a read only memory (ROM) 2106 or other static storage device coupled to the bus 2110 for storing static information, including instructions, that is not changed by the computer system 2100. Also coupled to bus 2110 is a non-volatile (persistent) storage device 2108, such as a magnetic disk, optical disk, or FLASH-EPROM, for storing information, including instructions, that persists even when the computer system 2100 is turned off or otherwise loses power.

Information, including instructions, is provided to the bus 2110 for use by the processor from an external input device 2112, such as a keyboard containing alphanumeric keys operated by a human user, or a sensor. A sensor detects conditions in its vicinity and transforms those detections into signals compatible with the signals used to represent information in computer system 2100. Other external devices coupled to bus 2110, used primarily for interacting with humans, include a display device 2114, such as a cathode ray tube (CRT) or a liquid crystal display (LCD), for presenting images, and a pointing device 2116, such as a mouse or a trackball or cursor direction keys, for controlling a position of a small cursor image presented on the display 2114 and issuing commands associated with graphical elements presented on the display 2114.

In the illustrated embodiment, special purpose hardware, such as an application specific integrated circuit (IC) 2120, is coupled to bus 2110. The special purpose hardware is configured to perform operations not performed by processor 2102 quickly enough for special purposes. Examples of application specific ICs include graphics accelerator cards for generating images for display 2114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 2100 includes switching system 2130 as special purpose hardware for switching information flow over a network. Switching system 2130 typically includes multiple communications interfaces, such as communications interface 2170, for coupling to multiple other devices. In general, each coupling is with a network link 2132 that is connected to another device in or attached to a network, such as local network 2180 in the illustrated embodiment, to which a variety of external devices with their own processors are connected. In some embodiments an input interface or an output interface or both are linked to each of one or more external network elements. Although three network links 2132a, 2132b, 2132c are included in network links 2132 in the illustrated embodiment, in other embodiments, more or fewer links are connected to switching system 2130. Network links 2132 typically provides information communication through one or more networks to other devices that use or process the information. For example, network link 2132b may provide a connection through local network 2180 to a host computer 2182 or to equipment 2184 operated by an Internet Service Provider (ISP). ISP equipment 2184 in turn provides data communication services through the public, world-wide packet-switching communication network of networks now commonly referred to as the Internet 2190. A computer called a server 2192 connected to the Internet provides a service in response to information received over the Internet. For example, server 2192 provides routing information for use with switching system 2130.

The switching system 2130 includes logic and circuitry configured to perform switching functions associated with passing information among elements of network 2180, including passing information received along one network link, e.g. 2132a, as output on the same or different network link, e.g., 2132c. The switching system 2130 switches information traffic arriving on an input interface to an output interface according to pre-determined protocols and conventions that are well known. In some embodiments, switching system 2130 includes its own processor and memory to perform some of the switching functions in software. In some embodiments, switching system 2130 relies on processor 2102, memory 2104, ROM 2106, storage 2108, or some combination, to perform one or more switching functions in software. For example, switching system 2130, in cooperation with processor 2104 implementing a particular protocol, can determine a destination of a packet of data arriving on input interface on link 2132a and send it to the correct destination using output interface on link 2132c. The destinations may include host 2182, server 2192, other terminal devices connected to local network 2180 or Internet 2190, or other routing and switching devices in local network 2180 or Internet 2190.

Computer system 2100 also includes one or more instances of a communications interface 2170 coupled to bus 2110. Communication interface 2170 provides a two-way communication coupling to a variety of external devices that operate with their own processors, such as printers, scanners and external disks. In general the coupling is with a network link 2132 that is connected to a local network 2180 to which a variety of external devices with their own processors are connected. For example, communication interface 2170 may be a parallel port or a serial port or a universal serial bus (USB) port on a personal computer. In some embodiments, communications interface 2170 is an integrated services digital network (ISDN) card or a digital subscriber line (DSL) card or a telephone modem that provides an information communication connection to a corresponding type of telephone line. In some embodiments, a communication interface 2170 is a cable modem that converts signals on bus 2110 into signals for a communication connection over a coaxial cable or into optical signals for a communication connection over a fiber optic cable. As another example, communications interface 2170 may be a local area network (LAN) card to provide a data communication connection to a compatible LAN, such as Ethernet. As another example, communications interface 2170 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 2170 sends and receives electrical, acoustic or electromagnetic signals, including infrared and optical signals, that carry information streams, such as digital data.

The term computer-readable medium is used herein to refer to any medium that participates in providing information to processor 2102, including instructions for execution. Such a medium may take many forms, including, but not limited to, non-volatile media, volatile media and transmission media. Non-volatile media include, for example, optical or magnetic disks, such as storage device 2108. Volatile media include, for example, dynamic memory 2104. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 2102, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 2102, except for carrier waves and other signals.

Logic encoded in one or more tangible media includes one or both of processor instructions on a computer-readable storage media and special purpose hardware, such as ASIC 2120.

The invention is related to the use of computer system 2100 for implementing the techniques described herein. According to one embodiment of the invention, those techniques are performed by computer system 2100 in response to processor 2102 executing one or more sequences of one or more instructions contained in memory 2104. Such instructions, also called software and program code, may be read into memory 2104 from another computer-readable medium such as storage device 2108. Execution of the sequences of instructions contained in memory 2104 causes processor 2102 to perform the method steps described herein. In alternative embodiments, hardware, such as application specific integrated circuit 2120, may be used in place of or in combination with software to implement the invention. Thus, embodiments of the invention are not limited to any specific combination of hardware and software.

The signals transmitted over network link 2132 and other networks through communications interface 2170, carry information to and from computer system 2100. Computer system 2100 can send and receive information, including program code, through the networks 2180, 2190 among others, through network link 2132 and communications interface 2170. In an example using the Internet 2190, a server 2192 transmits program code for a particular application, requested by a message sent from computer 2100, through Internet 2190, ISP equipment 2184, local network 2180 and communications interface 2170. The received code may be executed by processor 2102 as it is received, or may be stored in storage device 2108 or other non-volatile storage for later execution, or both. In this manner, computer system 2100 may obtain application program code in the form of a signal on a carrier wave.

Various forms of computer readable media may be involved in carrying one or more sequence of instructions or data or both to processor 2102 for execution. For example, instructions and data may initially be carried on a magnetic disk of a remote computer such as host 2182. The remote computer loads the instructions and data into its dynamic memory and sends the instructions and data over a telephone line using a modem. A modem local to the computer system 2100 receives the instructions and data on a telephone line and uses an infra-red transmitter to convert the instructions and data to a signal on an infra-red a carrier wave serving as the network link 2132. An infrared detector serving as communications interface 2170 receives the instructions and data carried in the infrared signal and places information representing the instructions and data onto bus 2110. Bus 2110 carries the information to memory 2104 from which processor 2102 retrieves and executes the instructions using some of the data sent with the instructions. The instructions and data received in memory 2104 may optionally be stored on storage device 2108, either before or after execution by the processor 2102.

Figure 22:
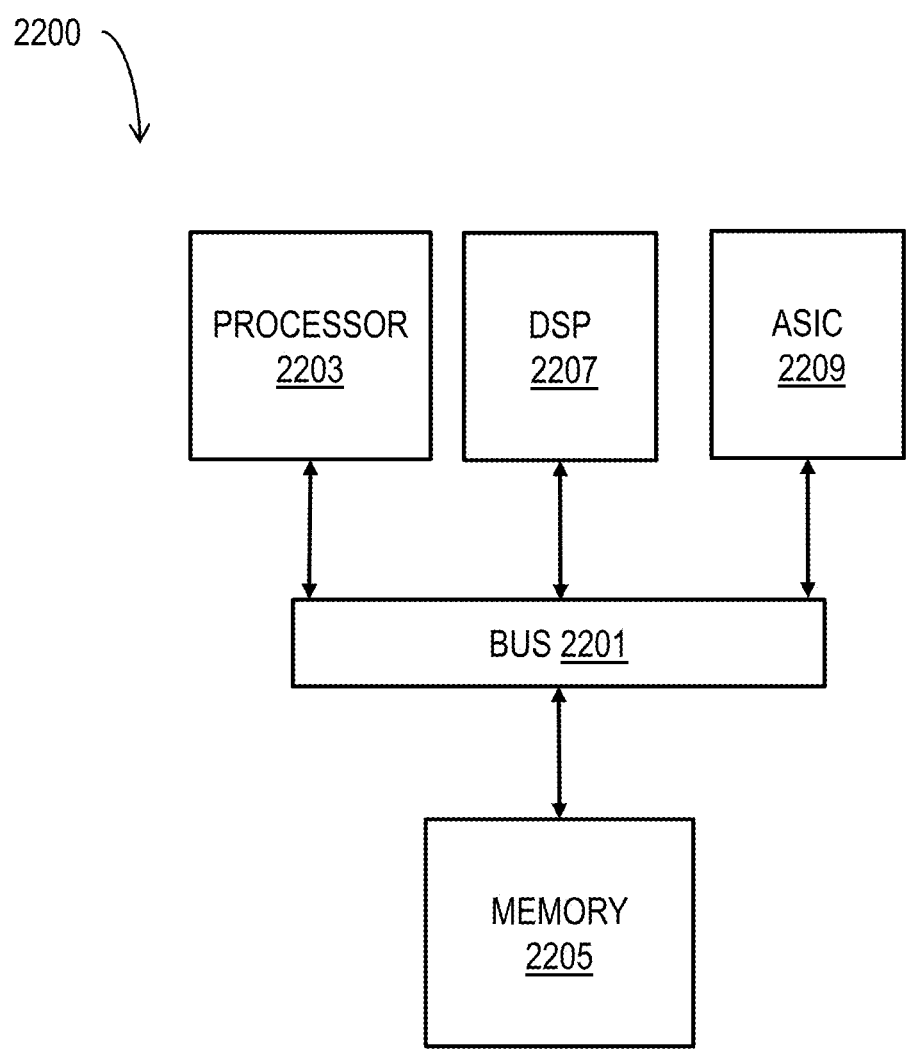
FIG. 22 illustrates a chip set upon which an embodiment of the invention may be implemented.

FIG. 22 illustrates a chip set 2200 upon which an embodiment of the invention may be implemented. Chip set 2200 is programmed to perform one or more steps of a method described herein and includes, for instance, the processor and memory components described with respect to FIG. 21 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 2200, or a portion thereof, constitutes a means for performing one or more steps of a method described herein.

In one embodiment, the chip set 2200 includes a communication mechanism such as a bus 2201 for passing information among the components of the chip set 2200. A processor 2203 has connectivity to the bus 2201 to execute instructions and process information stored in, for example, a memory 2205. The processor 2203 may include one or more processing cores with each core configured to perform independently. A multi-core processor enables multiprocessing within a single physical package. Examples of a multi-core processor include two, four, eight, or greater numbers of processing cores. Alternatively or in addition, the processor 2203 may include one or more microprocessors configured in tandem via the bus 2201 to enable independent execution of instructions, pipelining, and multithreading. The processor 2203 may also be accompanied with one or more specialized components to perform certain processing functions and tasks such as one or more digital signal processors (DSP) 2207, or one or more application-specific integrated circuits (ASIC) 2209. A DSP 2207 typically is configured to process real-world signals (e.g., sound) in real time independently of the processor 2203. Similarly, an ASIC 2209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 2203 and accompanying components have connectivity to the memory 2205 via the bus 2201. The memory 2205 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 2205 also stores the data associated with or generated by the execution of one or more steps of the methods described herein.

Figure 23:
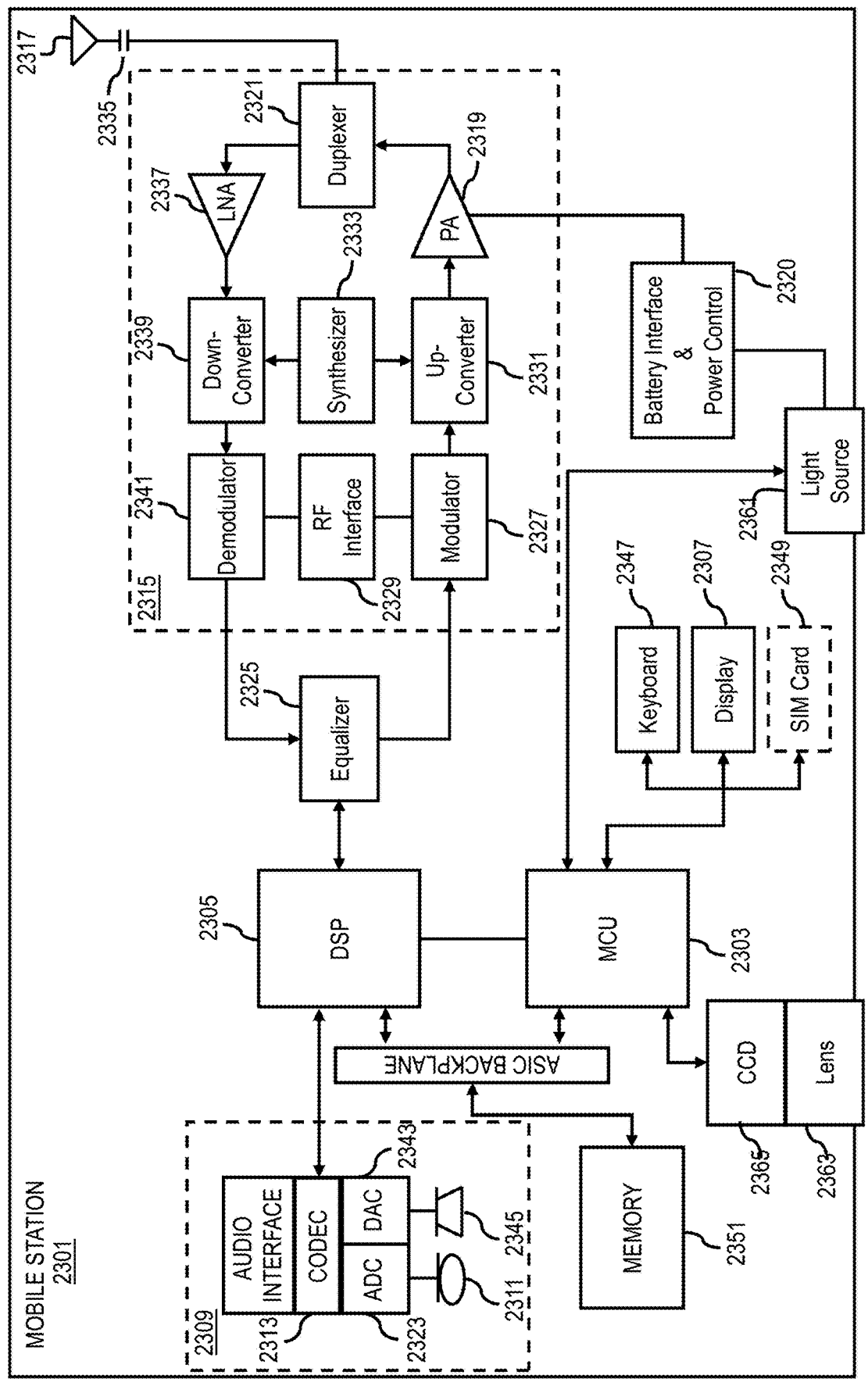
FIG. 23 is a diagram of exemplary components of a mobile terminal (e.g., cell phone handset) for communications, which is capable of operating in the system, according to one embodiment.

FIG. 23 is a diagram of exemplary components of a mobile terminal 2300 (e.g., cell phone handset) for communications, which is capable of operating in the system, according to one embodiment. In some embodiments, mobile terminal 2301, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2303, a Digital Signal Processor (DSP) 2305, and a receiver/transmitter unit including a microphone gain control unit and a speaker gain control unit. A main display unit 2307 provides a display to the user in support of various applications and mobile terminal functions that perform or support the steps as described herein. The display 2307 includes display circuitry configured to display at least a portion of a user interface of the mobile terminal (e.g., mobile telephone). Additionally, the display 2307 and display circuitry are configured to facilitate user control of at least some functions of the mobile terminal. An audio function circuitry 2309 includes a microphone 2311 and microphone amplifier that amplifies the speech signal output from the microphone 2311. The amplified speech signal output from the microphone 2311 is fed to a coder/decoder (CODEC) 2313.

A radio section 2315 amplifies power and converts frequency in order to communicate with a base station, which is included in a mobile communication system, via antenna 2317. The power amplifier (PA) 2319 and the transmitter/modulation circuitry are operationally responsive to the MCU 2303, with an output from the PA 2319 coupled to the duplexer 2321 or circulator or antenna switch, as known in the art. The PA 2319 also couples to a battery interface and power control unit 2320.

In use, a user of mobile terminal 2301 speaks into the microphone 2311 and his or her voice along with any detected background noise is converted into an analog voltage. The analog voltage is then converted into a digital signal through the Analog to Digital Converter (ADC) 2323. The control unit 2303 routes the digital signal into the DSP 2305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2325 for compensation of any frequency-dependent impairments that occur during transmission though the air such as phase and amplitude distortion. After equalizing the bit stream, the modulator 2327 combines the signal with a RF signal generated in the RF interface 2329. The modulator 2327 generates a sine wave by way of frequency or phase modulation. In order to prepare the signal for transmission, an up-converter 2331 combines the sine wave output from the modulator 2327 with another sine wave generated by a synthesizer 2333 to achieve the desired frequency of transmission. The signal is then sent through a PA 2319 to increase the signal to an appropriate power level. In practical systems, the PA 2319 acts as a variable gain amplifier whose gain is controlled by the DSP 2305 from information received from a network base station. The signal is then filtered within the duplexer 2321 and optionally sent to an antenna coupler 2335 to match impedances to provide maximum power transfer. Finally, the signal is transmitted via antenna 2317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2301 are received via antenna 2317 and immediately amplified by a low noise amplifier (LNA) 2337. A down-converter 2339 lowers the carrier frequency while the demodulator 2341 strips away the RF leaving only a digital bit stream. The signal then goes through the equalizer 2325 and is processed by the DSP 2305. A Digital to Analog Converter (DAC) 2343 converts the signal and the resulting output is transmitted to the user through the speaker 2345, all under control of a Main Control Unit (MCU) 2303 which can be implemented as a Central Processing Unit (CPU) (not shown).

The MCU 2303 receives various signals including input signals from the keyboard 2347. The keyboard 2347 and/or the MCU 2303 in combination with other user input components (e.g., the microphone 2311) comprise a user interface circuitry for managing user input. The MCU 2303 runs a user interface software to facilitate user control of at least some functions of the mobile terminal 2301 as described herein. The MCU 2303 also delivers a display command and a switch command to the display 2307 and to the speech output switching controller, respectively. Further, the MCU 2303 exchanges information with the DSP 2305 and can access an optionally incorporated SIM card 2349 and a memory 2351. In addition, the MCU 2303 executes various control functions required of the terminal. The DSP 2305 may, depending upon the implementation, perform any of a variety of conventional digital processing functions on the voice signals. Additionally, DSP 2305 determines the background noise level of the local environment from the signals detected by microphone 2311 and sets the gain of microphone 2311 to a level selected to compensate for the natural tendency of the user of the mobile terminal 2301.

The CODEC 2313 includes the ADC 2323 and DAC 2343. The memory 2351 stores various data including call incoming tone data and is capable of storing other data including music data received via, e.g., the global Internet. The software module could reside in RAM memory, flash memory, registers, or any other form of writable storage medium known in the art. The memory device 2351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2349 carries, for instance, important information, such as the cellular phone number, the carrier supplying service, subscription details, and security information. The SIM card 2349 serves primarily to identify the mobile terminal 2301 on a radio network. The card 2349 also contains a memory for storing a personal telephone number registry, text messages, and user specific mobile terminal settings.

In some embodiments, the mobile terminal 2301 includes a digital camera comprising an array of optical detectors, such as charge coupled device (CCD) array 2365. The output of the array is image data that is transferred to the MCU for further processing or storage in the memory 2351 or both. In the illustrated embodiment, the light impinges on the optical array through a lens 2363, such as a pin-hole lens or a material lens made of an optical grade glass or plastic material. In the illustrated embodiment, the mobile terminal 2301 includes a light source 2361, such as a LED to illuminate a subject for capture by the optical array, e.g., CCD 2365. The light source is powered by the battery interface and power control module 2320 and controlled by the MCU 2303 based on instructions stored or loaded into the MCU 2303.

4. Alterations, Deviations, Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A method implemented on a processor for sending ciphertext over a network, the method comprising:
  establishing a plurality of diverse paths between a single sending node and a different single receiving node, wherein the diverse paths are different physical layer links or different virtual private network (VPN) links or some combination;
  encrypting plaintext at the sending node using a first value for an encryption parameter to produce ciphertext and determining a key configured to convert the ciphertext to the plaintext;
  fragmenting at the sending node a cipher stream of cipher packets that indicates the ciphertext over at least two paths of the plurality of diverse paths; and sending from the sending node a key stream of key packets that indicates the key over at least one path of the plurality of diverse paths without introducing a random bit error, wherein no particular key packet is configured to decrypt any cipher packet on a same path as the particular key packet.

2. The method as recited in claim 1, wherein:

the key is a keystream nonce for XOR encryption that is the same keystream nonce for XOR decryption; and the cipher-packets and the key packets alternate over the diverse paths, but a cipher packet and a corresponding key packet are not sent over the same path.

3. The method as recited in claim 2, wherein the cipher packets and the key packets alternate randomly over the plurality of diverse paths.

4. The method as recited in claim 1, wherein each cipher packet and each key packet includes a sequence number and the cipher packets are not sent in the same sequence order.

5. The method as recited in claim 1, wherein each cipher packet and each key packet also includes data that indicates a session identifier that indicates a packet belongs to the plaintext and not to a different plaintext.

6. The method as recited in claim 1, wherein each cipher and each key packet also includes data that indicates a group identifier that indicates a path over which the packet is sent belongs to the plurality of diverse paths.

7. The method as recited in claim 1, wherein an encryption algorithm that uses the key is different for different packets or for different plaintext.

8. The method as recited in claim 1, wherein the plurality of diverse paths includes at least one unidirectional link.

9. The method as recited in claim 1, wherein the cipher packets are sent during a first time interval and the key packets are sent during a different second time interval.

10. The method as recited in claim 9, wherein the first time interval and the second time interval do not overlap in time.

11. A non-transitory computer-readable medium carrying one or more sequences of instructions, wherein execution of the one or more sequences of instructions by one or more processors causes the one or more processors to perform the steps of:

establishing a plurality of diverse paths between a single sending node and a different single receiving node, wherein the diverse paths are different physical layer links or different virtual private network (VPN) links or some combination;

encrypting plaintext using a first value for an encryption parameter to produce ciphertext and determining a key configured to convert the ciphertext to the plaintext;

fragmenting at the sending node a cipher stream of cipher packets that indicates the ciphertext over at least two paths of the plurality of diverse paths; and sending a key stream of key packets that indicates the key over at least one path of the plurality of diverse paths without introducing a random bit error, wherein no particular key packet is configured to decrypt any cipher packet on a same path as the particular key packet.

12. A system comprising:

at least one processor;

a plurality of communication links; and at least one memory including one or more sequences of instructions, the at least one memory and the one or more sequences of instructions configured to, with the at least one processor, cause the apparatus to perform at least the following, establishing a plurality of diverse paths between a single sending node and a different single receiving node, wherein the diverse paths are different physical layer links or different virtual private network (VPN) links or some combination;

encrypting plaintext at the sending node using a first value for an encryption parameter to produce ciphertext and determining a key configured to convert the ciphertext to the plaintext;

fragmenting a cipher stream of cipher packets that indicates the ciphertext over at least two paths of the plurality of diverse paths; and sending a key stream of key packets that indicates the key over at least one path of the plurality of diverse paths without introducing a random bit error, wherein no particular key packet is configured to decrypt any cipher packet on a same path as the particular key packet.

\* \* \* \* \*